(12) United States Patent
Na

(10) Patent No.: US 10,608,706 B2
(45) Date of Patent: Mar. 31, 2020

(54) ELECTRONIC DEVICE AND METHOD FOR PROVIDING FEEDBACK PATH OF TRANSMISSION SIGNAL

(71) Applicant: Samsung Electronics Co., Ltd., Gyeonggi-do (KR)

(72) Inventor: Hyo-Seok Na, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/196,490

(22) Filed: Nov. 20, 2018

(65) Prior Publication Data

US 2019/0158154 A1    May 23, 2019

(30) Foreign Application Priority Data

Nov. 20, 2017 (KR) ........................ 10-2017-0154920

(51) Int. Cl.
| | |
|---|---|
| H04B 7/0404 | (2017.01) |
| H04B 7/0417 | (2017.01) |
| H04B 17/14 | (2015.01) |
| H04B 1/00 | (2006.01) |
| H04B 1/3888 | (2015.01) |
| H04B 7/0413 | (2017.01) |

(52) U.S. Cl.
CPC ............. *H04B 7/0404* (2013.01); *H04B 1/00* (2013.01); *H04B 1/0064* (2013.01); *H04B 1/3888* (2013.01); *H04B 7/0417* (2013.01); *H04B 17/14* (2015.01); *H04B 7/0413* (2013.01)

(58) Field of Classification Search
CPC ............................ H04B 7/0404; H04B 7/0417
USPC ...................................................... 375/267
See application file for complete search history.

(56) References Cited

U.S. PATENT DOCUMENTS

| | | | |
|---|---|---|---|
| 9,900,785 B2 * | 2/2018 | Villardi | H04B 7/0682 |
| 2010/0093282 A1 * | 4/2010 | Martikkala | H04B 17/14 |
| | | | 455/63.4 |

(Continued)

OTHER PUBLICATIONS

International Search Report dated Feb. 20, 2019 issued in counterpart application No. PCT/KR2018/014178, 8 pages.

*Primary Examiner* — Hirdepal Singh
(74) *Attorney, Agent, or Firm* — The Farrell Law Firm, P.C.

(57) ABSTRACT

An electronic device is provided, which includes a housing, a first antenna at a first position, a second antenna at a second position, and a wireless communication circuit inside the housing and connected to the first and second antennas and including modem, a source RF circuit connected to modem and generating an IF signal, a first RF circuit at a third position closer to the first position, a second RF circuit at a fourth position closer to the second position, wherein the first and second RF circuits alternately receive a signal from the source RF circuit to transmit a signal through the first and second antennas, a first electrical path between the source RF circuit and the first RF circuit, a second electrical path between the source RF circuit and the second RF circuit, and a third electrical path between the first and second RF circuits, wherein the first RF circuit transmits a first feedback of the transmission signal to the source RF circuit through the third and second electrical paths, and wherein the second RF circuit transmits a second feedback of the transmission signal to the source RF circuit through the third and first electrical paths.

20 Claims, 13 Drawing Sheets

(56) References Cited

U.S. PATENT DOCUMENTS

| | | |
|---|---|---|
| 2010/0309901 A1 | 12/2010 | Beghini et al. |
| 2011/0032854 A1* | 2/2011 | Carney .................... H04B 1/52 |
| | | 370/294 |
| 2011/0237207 A1 | 9/2011 | Bauder |
| 2012/0287978 A1* | 11/2012 | O'Keeffe ............. H01Q 21/245 |
| | | 375/222 |
| 2016/0295554 A1 | 10/2016 | Ko et al. |
| 2016/0308276 A1 | 10/2016 | Chang et al. |
| 2017/0054478 A1* | 2/2017 | Da Silveira .............. H04B 1/04 |
| 2017/0230089 A1* | 8/2017 | Kim .................... H04B 7/0408 |
| 2019/0072647 A1* | 3/2019 | Schat .................... G01S 7/4056 |
| 2019/0081596 A1* | 3/2019 | Dunworth ............ H01Q 1/2283 |

* cited by examiner ered through the first antenna element, a second RF circuit configured to process a radio signal transmitted and received through the second antenna element, a source RF circuit electrically connected to the first RF circuit and the second RF circuit, and configured to control operations of the first RF circuit and the second RF circuit, a first electrical path between the source RF circuit and the first RF circuit, a second electrical path between the source RF circuit and the second RF circuit, and a third electrical path between the first RF circuit and the second RF circuit, wherein the source RF circuit is configured to deliver a feedback signal received from any one of the first RF circuit and the second RF circuit to the other RF circuit.

ELECTRONIC DEVICE AND METHOD FOR PROVIDING FEEDBACK PATH OF TRANSMISSION SIGNAL

CROSS-REFERENCE TO RELATED APPLICATION(S)

This application is based on and claims priority under 35 U.S.C. § 119(a) to Korean Patent Application No. 10-2017-0154920, filed on Nov. 20, 2017, in the Korean Intellectual Property Office, the entire disclosure of which is incorporated herein by reference.

BACKGROUND

1. Field

The present disclosure relates to an electronic device that supports transmission diversity or multi input multi output (MIMO) and a method for controlling the electronic device.

2. Description of the Related Art

In order to meet the demand for wireless data traffic which has soared since 4G communication systems came to market, there are ongoing efforts to develop enhanced 5G communication systems or pre-5G communication systems. The 5G communication systems and pre-5G communication systems are called beyond 4G network communication systems or post long term evolution (LTE) systems.

For higher data transmission rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive MIMO, full dimensional MIMO (FD-MIMO), array antenna, analog beamforming, and large-scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

There are also other schemes under development for the 5G system including, e.g., hybrid frequency shift keying (FSK) and quadrature amplitude modulation (QAM) (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Wireless communication devices for 5G communication are capable of supporting communication in an ultra-high frequency (e.g., mmWave) band based on multiple antennas (e.g., MIMO, etc.). To this end, the wireless communication device may include RF signal processing circuits for processing transmitted and received signals for each of a plurality of antennas. The RF signal processing circuits may include various circuit configurations for signal processing in an ultra-high frequency band. In addition, in a cellular and mobile communication environment, to control power of a transmission signal, a wireless communication device may include a circuit configuration that processes a feedback signal for monitoring an output signal (i.e., the transmission signal).

For example, for an electronic device required to be in a small size and a light weight like a portable terminal, various circuit configurations for processing an ultra-high frequency signal (and a feedback signal) impose complexity and has a difficulty in implementation thereof due to mounting space restrictions.

SUMMARY

The present disclosure has been made to address the above problems and disadvantages and to provide at least the following advantages.

An aspect of the present disclosure provides an interconnect of a plurality of RF circuits and delivers a feedback signal of any one of the RF circuits through a reception path of another RF circuit, when implementing a feedback path for delivering a feedback signal in an electronic device.

According to an aspect of the present disclosure, an electronic device is provided. The electronic device includes a housing, a first antenna element arranged at a first position inside or on the housing, a second antenna element arranged at a second position, which is separated from the first position, inside or on the housing, and a wireless communication circuit arranged inside the housing and electrically connected to the first antenna element and the second antenna element, wherein the wireless communication circuit includes a wireless modem, a source RF circuit electrically connected to the wireless modem and configured to generate an intermediate frequency (IF) signal, a first RF circuit arranged at a third position closer to the first position than to the second position, a second RF circuit arranged at a fourth position closer to the second position than to the first position, wherein the first RF circuit and the second RF circuit are configured to alternately receive a signal transmitted from the source RF circuit to transmit a transmission signal through the first antenna element and the second antenna element, respectively, a first electrical path between the source RF circuit and the first RF circuit, a second electrical path between the source RF circuit and the 25 second RF circuit, and a third electrical path between the first RF circuit and the second RF circuit, wherein the first RF circuit is configured to transmit a first feedback associated with the transmission signal therefrom to the source RF circuit through the third electrical path and the second electrical path, and wherein the second RF circuit is configured to transmit a second feedback associated with the transmission signal therefrom to the source RF circuit through the third electrical path and the first electrical path.

According to another aspect of the present disclosure, a method for providing a feedback path of a transmission signal in an electronic device is provided. The method includes identifying active/inactive states of a plurality of antennas, connecting a feedback signal with respect to a transmission signal of an antenna currently in the active state with a path of a reception signal of an antenna currently in the inactive state, and identifying the feedback signal with respect to the transmission signal of the antenna currently in the active state through the path of the reception signal of the antenna currently in the inactive state.

According to another aspect of the present disclosure, an apparatus for providing a feedback path in an electronic device is provided. The apparatus includes a first antenna element, a second antenna element, a first RF circuit configured to process a radio signal transmitted and received through the first antenna element, a second RF circuit configured to process a radio signal transmitted and received through the second antenna element, a first feedback electrical path electrically connecting the first RF circuit with the second RF circuit, a first coupler included on the first RF circuit, a first switch electrically connected to the first coupler and a first end of the first feedback electrical path, a second switch included on a reception path of the first RF circuit and electrically connected to the first switch, a second coupler included on a transmission path of the second RF circuit, a third switch electrically connected to the second coupler and a second end of the first feedback electrical path, and a fourth switch included on a reception path of the second RF circuit and electrically connected to the third switch.

BRIEF DESCRIPTION OF THE DRAWINGS

The above and other aspects, features and advantages of certain embodiments of the present disclosure will be more apparent from the following description taken in conjunction with the accompanying drawings, in which.

DETAILED DESCRIPTION

Figure 1:
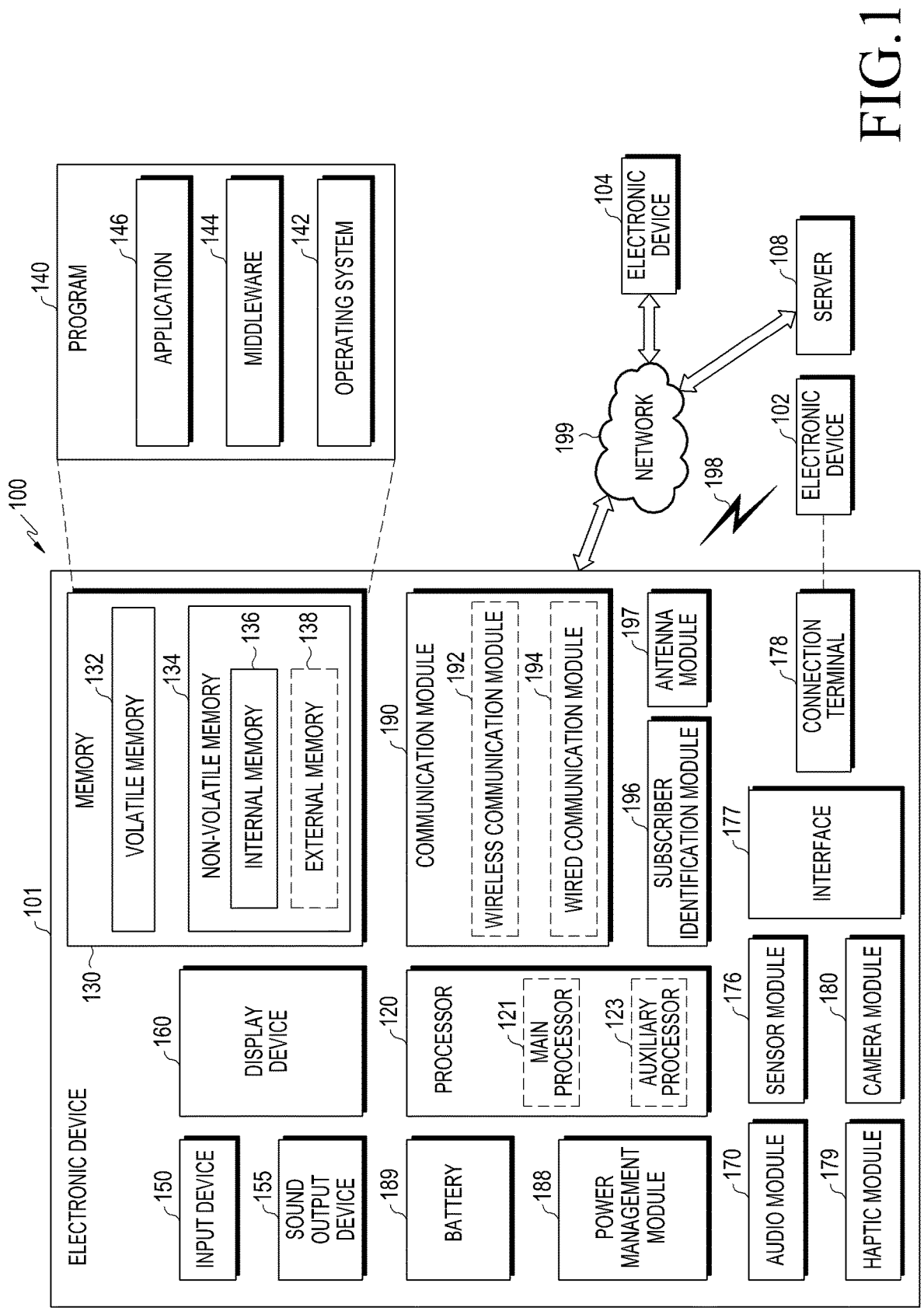
FIG. 1 is a block diagram of an electronic device in a network environment according to an embodiment.

Hereinafter, various embodiments of the present disclosure are disclosed with reference to the accompanying drawings. Throughout the drawings, like reference numerals will be understood to refer to like parts, components, and structures.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or a second electronic device 104 or a server 108 via a second network 199 (e.g., a long-range wireless communication network). The electronic device 101 may communicate with the second electronic device 104 via the server 108. The electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, an antenna module 197, and a connection terminal 178. The electronic device 101 may exclude at least one (e.g., the display device 160 or the camera module 180) of the components or add other components. Some components may be integrated together, e.g., the sensor module 176 (e.g., a fingerprint sensor, an iris sensor, or an illuminance sensor) may be embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. The processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. In this case, the auxiliary processor 123 may be operated separately from or embedded in the main processor 121.

In this case, the auxiliary processor 123 may control at least some functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., performing an application). The auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146. The input device 150 may be a device for receiving a command or data, which is to be used for a component (e.g., the processor 120) of the electronic device 101, from outside (e.g., a user) of the electronic device 101. The input device 50 may include, e.g., a microphone, a mouse, or a keyboard.

The sound output device 155 may be a device for outputting sound signals to outside of the electronic device 101. The sound output device 155 may include, e.g., a speaker which is used for general purposes, such as playing multimedia or recording and playing, and a receiver used for call receiving purposes only. The receiver may be formed integrally or separately from the speaker.

The display device 160 may be a device for visually providing information to a user of the electronic device 101. The display device 160 may include, e.g., a display, a hologram device, or a projector and a control circuit for controlling the display, hologram device, or projector. The display device 160 may include touch circuitry or a pressure sensor capable of measuring the pressure of a touch.

The audio module 170 may convert a sound into an electrical signal and vice versa. According to an embodiment, the audio module 170 may obtain a sound through the input device 150 or output a sound through the sound output device 155 or the first electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a biometric (bio) sensor, a thermometer, a humidity sensor, or an illuminance sensor.

The interface 177 may support a designated protocol enabling a wired or wireless connection with the first electronic device 102. According to an embodiment, the interface 177 may include a high definition multimedia interface (HDMI), a universal serial bus (USB) interface, a secure digital (SD) card interface, or an audio interface.

The connection terminal 178 may include a connector, e.g., an HDMI connector, a USB connector, an SD card connector, or an audio connector (e.g., a headphone connector), which is able to physically connect the electronic device 101 with the first electronic device 102.

The haptic module 179 may convert an electrical signal into a mechanical stimulus (e.g., a vibration or motion) or electrical stimulus which may be recognized by a user via a tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and the first electronic device 102, the second electronic device 104, or the server 108 and performing communication through the established communication channel. The communication module 190 may include one or more communication processors that are operated independently from the processor 120 (e.g., an AP) and supports wired or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through the first network 198 (e.g., a short-range communication network, such as Bluetooth, wireless-fidelity (Wi-Fi) direct, or an Infrared Data Association (IrDA) standard) or the second network 199 (e.g., a long-range communication network, such as a cellular network, the Internet, or a communication network (e.g., a LAN or a wide area network (WAN)). The above-enumerated types of communication modules 190 may be implemented in a single integrated circuit or chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from outside. The communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to an embodiment, commands or data may be transmitted or received between the electronic device 101 and the external second electronic device 104 via the server 108 coupled with the second network 199. Each of the first electronic device 102 and the second electronic device 104 may be a device of the same type as or a different type than the electronic device 101. Some or all of the operations performed by the electronic device 101 may be performed in another electronic device or a plurality of other electronic devices. When the electronic device 101 must perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To this end, for example, cloud computing, distributed computing, or client-server computing may be used. The electronic device 101 according to an embodiment may be one of various types of electronic devices. The electronic devices may include, for example, a portable communication device (e.g., a smart phone), a computer, a portable multimedia device, a portable medical device, a camera, a wearable device, or a home appliance. However, the electronic devices are not intended to be limited to those described above.

It should be appreciated that various embodiments and the terms used herein are not intended to limit the present disclosure to particular embodiments but include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st", "2nd," "first" and "second" may be used to simply distinguish a corresponding component from another component, but is not intended to limit the components in another aspect (e.g., importance or order). When it is described that an element (such as a first element) is "operatively or communicatively coupled with/to" or "connected" to another element (such as a second element), the element can be directly connected to the other element or may be connected to the other element through another element (e.g., a third element).

As used herein, the term "module" may include a unit implemented in hardware, software, or firmware, and may interchangeably be used with other terms, for example, "logic," "logic block," "part," or "circuitry." The term "module" may indicate a single integral component, or a minimum unit or part thereof, adapted to perform one or more functions. For example, the term "module" may indicate a device that may be implemented as an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101). The machine may invoke stored instructions from the storage medium and operate according to the invoked instructions, and may include an electronic device 101 according to the disclosed embodiments. When the instructions are executed by a processor 120, the processor may perform functions corresponding to the instructions. The one or more instructions may include code generated by a complier or code executable by an interpreter. The machine-readable storage medium may be provided in the form of a non-transitory storage medium. Wherein, the term "non-transitory" indicates that the storage medium is a tangible device, but does not include a signal (e.g., an electromagnetic wave), and this term does not differentiate between where data is semi-permanently stored in the storage medium and where the data is temporarily stored in the storage medium.

According to an embodiment, a method of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to an embodiment may be carried out sequentially, in parallel, repeatedly, or heuristically, one or more of the operations may be executed in a different order or omitted, or one or more other operations may be added.

An embodiment may provide a technique for providing a feedback path of a transmission signal in an electronic device that emits a radio signal through a plurality of antennas, and may include or may be applied to various types of electronic devices. In the following description of various embodiments, a device of the present disclosure is described as performing communication, for example, in an ultra-high frequency (e.g., mmWave) band for 5G communication, but the present disclosure is not intended to be limited to a detailed communication type, and at least some embodiments of the present disclosure may be applied in a device for transmitting a radio signal in various bands through at least two antennas.

Figure 2:
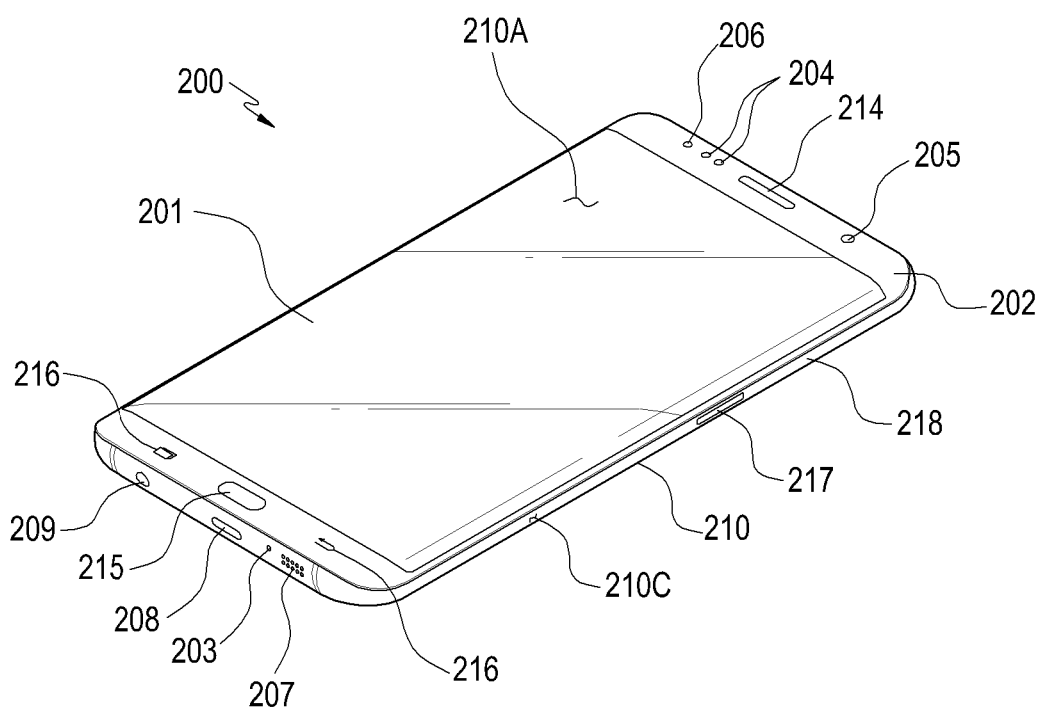
FIG. 2 is a perspective view of a front surface of a mobile electronic device according to an embodiment.
Figure 3:
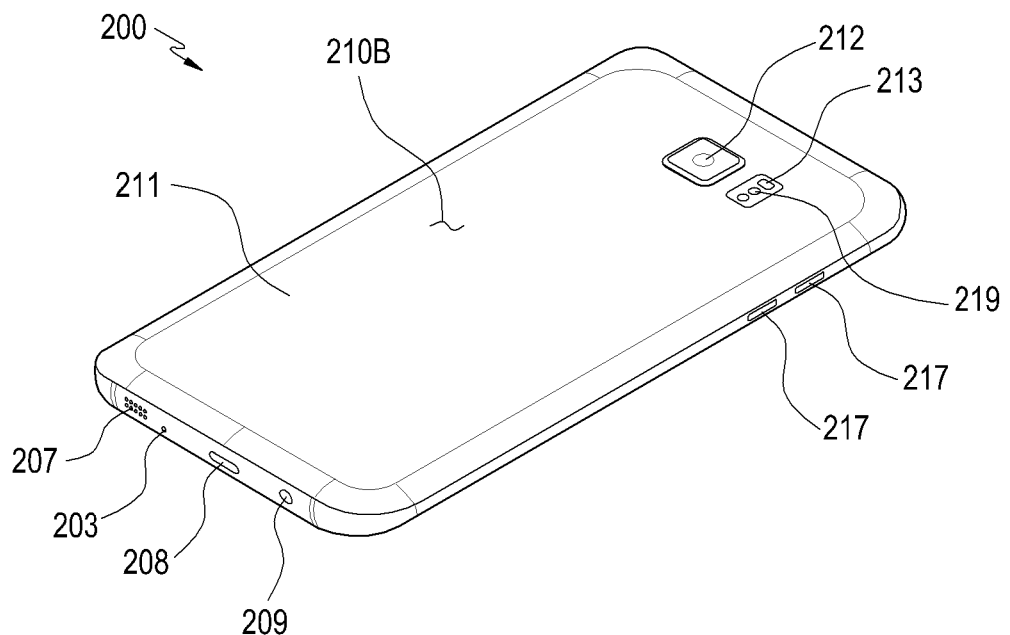
FIG. 3 is a perspective view of a rear surface of the mobile electronic device of FIG. 2.

FIG. 2 is a perspective view of a front surface of a mobile electronic device according to an embodiment, and FIG. 3 is a perspective view of a rear surface of the electronic device of FIG. 2.

Referring to FIGS. 2 and 3, an electronic device 200 according to an embodiment may include a housing 210 that includes a first surface (e.g., a front surface 210A), a second surface (e.g., a rear surface 210B), and a side surface 210C enclosing a space between the first surface 210A and the second surface 210B. In an embodiment, the housing 210 may refer to a structure that forms some of the first surface 210A, the second surface 210B, and the side surface 210C of FIG. 2. The first surface 210A may be formed by a front plate 202, at least a part of which is substantially transparent (for example, a glass plate including various coating layers or a polymer plate). The second surface 210B is formed by a rear plate 211 that is substantially opaque. The rear plate 211 is formed by, for example, coated or painted glass, ceramic, polymer, metal (e.g., aluminum, stainless steel (STS), or magnesium) or a combination of at least two of the listed materials. The side surface 210C is coupled with the front plate 202 and the rear plate 211, and is formed by a side bezel structure (or a "side member") 218 including metal and/or polymer. The rear plate 211 and the side bezel structure 218 may be formed as one piece and may include the same material (e.g., a metal material such as aluminum).

In an embodiment, the electronic device 200 may include at least one of a display 201, audio modules 203, 207, and 214, sensor modules 204 and 219, camera modules 205, 212, and 213, key input devices 215, 216, and 217, an indicator 206, and connector holes 208 and 209. The electronic device 200 may exclude at least one (e.g., the key input devices 215, 216, and 217 or the indicator 206) of the components or add other components.

The display 201 may be exposed through the most part of, for example, the front plate 202. The display 201 is coupled with or arranged in adjacent to a touch sensing circuit, a pressure sensor capable of measuring a strength (pressure) of a touch, and/or a digitizer for detecting a magnetic-type stylus pen.

The audio modules 203, 207, and 214 may include the microphone holes 203 and the speaker holes 207 and 214. Inside the microphone hole 203 may be arranged a microphone for obtaining external sound, and may also be arranged a plurality of microphones for sensing a direction of the sound in an embodiment. The speaker holes 207 and 214 may include an external speaker hole 207 and a call receiver hole 214. In an embodiment, the speaker holes 207 and 214 and the microphone hole 203 may be implemented as one hole or a speaker may be included without the speaker holes 207 and 214 (e.g., a piezo speaker).

The sensor modules 204 and 219 generate an electrical signal or data value corresponding to an internal operating state or external environmental state of the electronic device 200. The sensor modules 204 and 219 may include a first sensor module 204 (e.g., a proximity sensor) and/or a second sensor module, e.g., a fingerprint sensor) arranged on the first surface 210A of the housing 210 and/or a third sensor module 219 (e.g., a heart rate monitor (HRM) sensor) arranged on the second surface 210B of the housing 210. The fingerprint sensor may be arranged on the second surface 210B of the housing 210 as well as the first surface 210A of the housing 210 (e.g., a home key button 215). The electronic device 200 may further include at least one of a sensor module, e.g., a gesture sensor, a gyro sensor, an atmospheric pressure sensor, a magnetic sensor, an acceleration sensor, a grip sensor, a color sensor, an IR sensor, a bio sensor, a temperature sensor, a humidity sensor, or the illuminance sensor 104.

The camera modules 205, 212, and 213 may include a first camera device 205 arranged on the first surface 210A of the electronic device 200, a second camera device 212 arranged on the second surface 210B, and/or a flash 213. The camera modules 205 and 212 may include one lens or a plurality of lenses, an image sensor, and/or an image signal processor. The flash 213 may include, for example, a light-emitting diode or a xenon lamp. In an embodiment, two or more lenses (a wide lens and a telephoto lens) and image sensors may be arranged on a surface of the electronic device 200.

The key input devices 215, 216, and 217 may include the home key button 215 arranged on the first surface 210A of the housing 210, a touch pad 216 arranged around the home key button 215, and/or a side key button 217 arranged on the side surface 210C of the housing 210. In an embodiment, the electronic device 200 may exclude some or all of the above-mentioned key input devices 215, 216, and 217, and the excluded key input devices 215, 216, and 217 may be implemented in other forms such as a soft key, etc., on the display 201.

The indicator 206 may be arranged, for example, on the first surface 210A of the housing 210. The indicator 206 may provide state information of the electronic device 200 in the form of light, and may include a light-emitting diode (LED).

The connector holes 208 and 209 may include a first connector hole 208 capable of accommodating a connector (e.g., a USB connector) for transmitting and receiving power and/or data with an external electronic device and/or a second connector hole 209 (e.g., an earphone jack) capable of accommodating a connector for transmitting and receiving an audio signal with the external electronic device.

Figure 4:
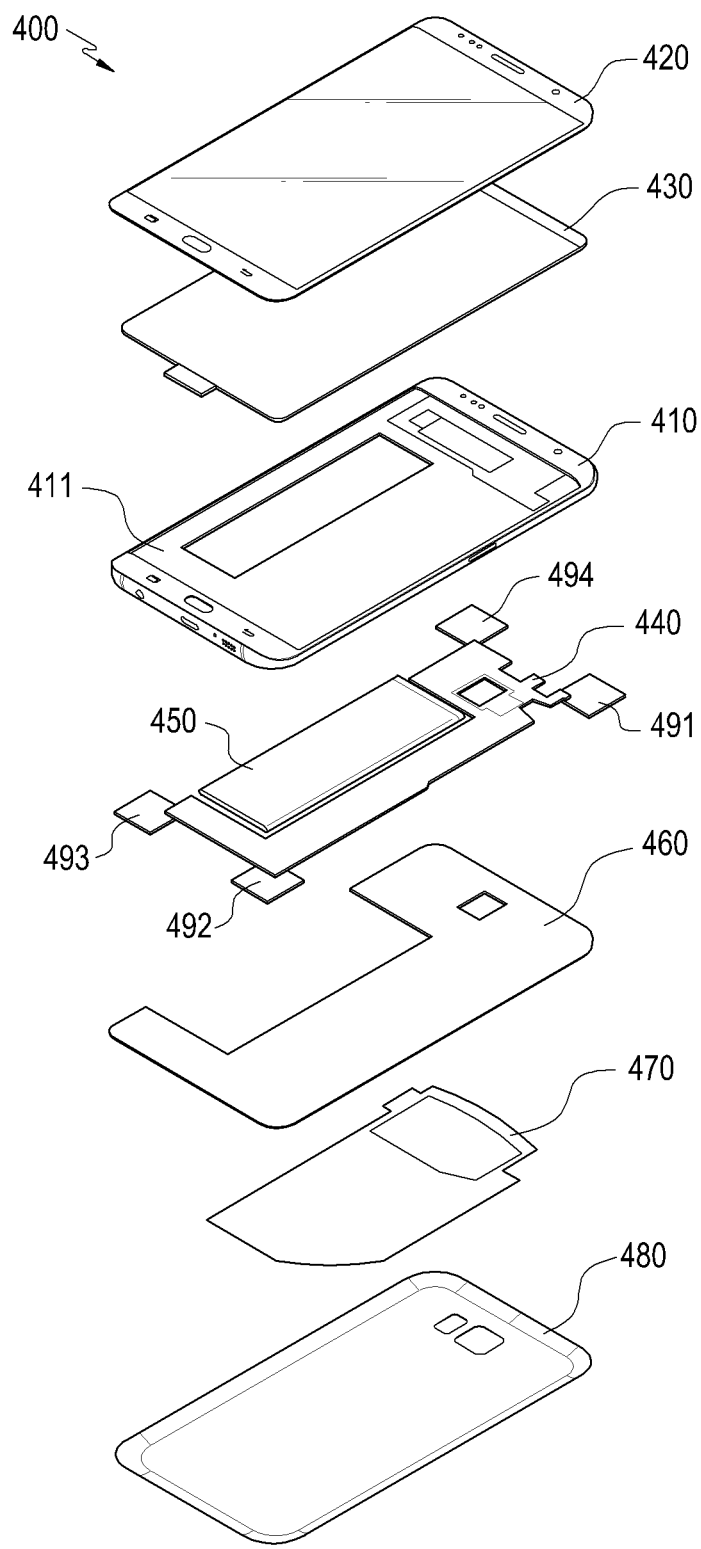
FIG. 4 is an exploded perspective view of the mobile electronic device of FIG. 2.

FIG. 4 is an exploded perspective view of the electronic device of FIG. 2. Referring to FIG. 4, an electronic device 400 according to various embodiments of the present disclosure may include a side bezel structure 410, a first support member 411 (e.g., a bracket), a front plate 420, a display 430, a printed circuit board (PCB) 440, a battery 450, a plurality of antenna modules 491, 492, 493, and 494, a second support member 460 (e.g., a rear case), an antenna 470, and a rear plate 480. The electronic device 400 may exclude at least one (e.g., the first support member 411 or the second support member 460) of the components or add other components. At least one of the components of the electronic device 400 may be the same as or similar with at least one of the components of the electronic device 200 of FIG. 2 or FIG. 3, and a description thereof is not repeated here.

The first support member 411 is arranged inside the electronic device 400 and is connected with the side bezel structure 410 or is formed as one piece with the side bezel structure 410. The first support member 411 may be formed of, for example, a metal material and/or a non-metallic (e.g., polymer) material. The first support member 411 is coupled with the display 430 on a surface thereof and with the PCB 440 on another surface thereof. On the PCB 440 are mounted a processor, a memory, and/or an interface. The processor may include one or more of, for example, a central processing unit, an application processor, a graphic processor, an image signal processor, a sensor hub processor, and a communication processor (CP).

The memory may include, for example, a volatile and/or nonvolatile memory.

The interface may include, for example, an HDMI, a USB, an SD card interface, and/or an audio interface. The interface may electrically or physically connect, for example, the electronic device 200 with an external electronic device, and may include an USB connector, an SD card/multi-media card (MMC) connector, or an audio connector.

The battery 450 may be a device for supplying power to at least one component of the electronic device 400. The battery 450 may include, e.g., a primary cell which is not rechargeable, a secondary cell which is rechargeable, or a fuel cell. At least a part of the battery 400 may be arranged on substantially the same plane as, for example, the PCB 440. The battery 450 is arranged as one piece inside the electronic device 400 or is arranged removably from the electronic device 400.

The antenna 470 is arranged between the rear plate 480 and the battery 450. The antenna 470 may include, for example, a near field communication (NFC) antenna, a wireless charging antenna, and/or a magnetic secure transmission (MST) antenna. The antenna 470 may perform short-range communication or wirelessly transmit and receive power needed for charging, with, for example, an external device. An antenna structure may be formed by a part or a combination of the side bezel structure 410 and/or the first support member 411.

The side bezel structure 410, the first support member 411, and the second support member 460 may form the housing 210 as a whole. The housing 210 may support the PCB 440 and the plurality of antenna modules 491 through 494. The housing 210 may have the shape of a substantially flat plate. In an embodiment, a part of the housing 210, e.g., at least a part of an edge thereof may have the shape of a curved surface.

The housing 210, which is at least partially formed of a metal material to supplement and improve the rigidity of the electronic device 200, provides a proper installation position of electronic parts, and provides installation positions for some electronic parts where the electronic parts are installed isolated from each other.

The rear plate 480 may be a part of the housing 210. For example, in various embodiments, the housing 210 and the rear plate 480 are described as separate components, but the rear plate 480 may form a uni-body with the housing 210 or may be a part of the housing 210.

The plurality of antenna modules 491 through 494 may include four antenna modules, for example, a first antenna module 491, a second antenna module 492, a third antenna module 493, and a fourth antenna module 493. For example, the first antenna module 491 and the second antenna module 492 may be implemented to transmit and receive RF signals (referred to as frequency signals A and B) having different characteristics for MIMO implementation. For example, the first antenna module 491 and the third antenna module 493 may be configured to transmit and receive RF signals (referred to as frequency signals A1 and A2) having identical characteristics for diversity implementation, for example, at the same time. For example, the second antenna module 492 and the fourth antenna module 494 may be configured to transmit and receive RF signals (referred to as frequency signals B1 and B2) having identical characteristics for diversity implementation, for example, at the same time. The plurality of antenna modules may include only two antenna modules, for example, the first antenna module 491 and the second antenna module 492, but in an example illustrated in FIG. 2 and other accompanying drawings, four antenna modules are included to implement MIMO and diversity at the same time.

Considering RF transmission and reception characteristics, when the first antenna module 491 is arranged at a first position inside or on the housing 210, the second antenna module 492 may be arranged at a second position that is separated from the first position inside or on the housing 210. For example, the first antenna module 491 and the third antenna module 493 may be arranged considering a distance therebetween corresponding to diversity characteristics. For example, the second antenna module 492 and the fourth antenna module 494 may also be arranged considering a distance therebetween inside or on the housing 210.

The housing 210 may include a front plate and a rear plate that is directed opposite to the front plate with respect to a radiation direction of the plurality of antenna modules 491 through 494. The housing 210 may have a rectangular shape including a first side having a first length, a second side having a second length longer than the first length, a third side having the first length, and a fourth side having the second length.

When viewed from top of the front plate of the housing 210, the first antenna module 491 and the second antenna module 492 are arranged closer to the first side than the third side. For example, the third antenna module 493 and the fourth antenna module 494 may be arranged closer to the third side than the first side when viewed from the top of the front plate of the housing 210. For example, the first antenna module 492 and the third antenna module 493 may be arranged diagonally to each other when viewed from the top of the front plate of the housing 210 in the rectangular shape. For example, the second antenna module 492 and the fourth antenna module 494 may be arranged diagonally to each other when viewed from the top of the front plate of the housing 210.

The plurality of antenna modules 491 through 494 may be connected with an antenna element and a part of a wireless communication circuit that is connected with the antenna element to process transmission and reception signals of ultra-high frequencies. The antenna element may be implemented as, for example, a patch-type radiation element array (e.g., a 4×4 radiation element array). A chip having a part of the wireless communication circuit implemented therein may have a structure in which the chip is coupled for example, through PCB wiring, in a side surface or a lower side (a rear side with respect to the radiation direction) of the patch-type radiation element array.

Figure 5:
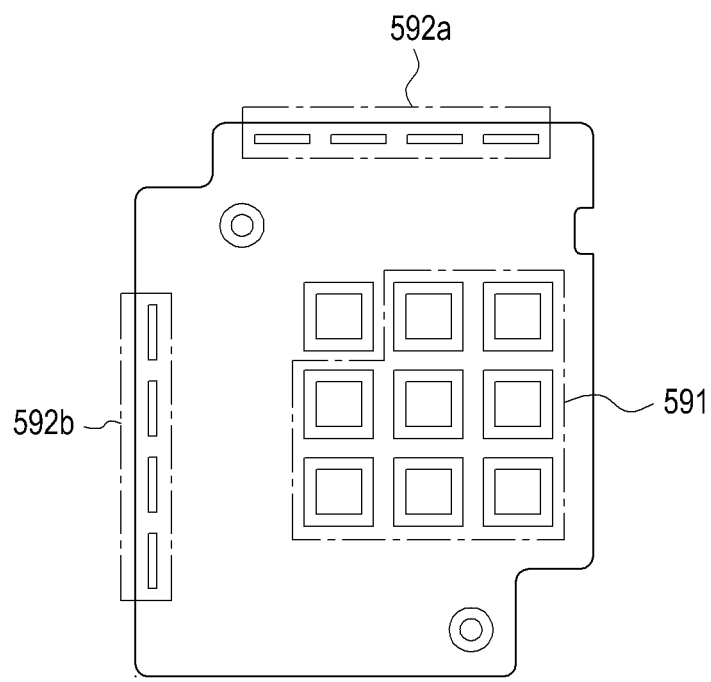
FIGS. 5 and 6 are illustrations of a structure of an antenna module according to an embodiment.
Figure 6:
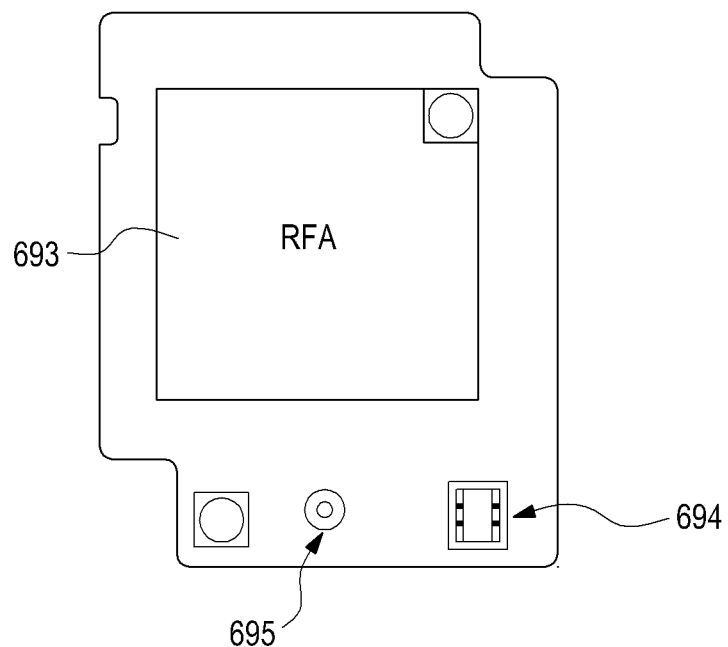

FIGS. 5 and 6 are illustrations of a structure of an antenna module according to an embodiment, and show an example of a structure applicable to, for example, the plurality of antenna modules 491 to 494 of FIG. 4.

Referring to FIGS. 5 and 6, an antenna module may include antenna elements 591, 592a, and 592b formed on a first surface of one PCB and a chip (e.g., RFA) 693 implementing a part of the wireless communication circuit, formed on a second surface of the PCB.

The antenna element formed on the first surface of the PCB may include a total of 16 radiation elements including 8 patch-type radiation elements 591 formed around the center of the first surface, 4 dipole-type radiation elements 592a formed on a widthwise side surface of the PCB, and 4 dipole-type radiation elements 592b formed on a longitudinal side surface of the PCB.

The chip 693 implementing a part of the wireless communication circuit, a coaxial cable connector 695 for connection with a main PCB (the PCB 440 of FIG. 4), and a board-to-board (B-to-B) connector 694 may be formed on the second surface of the PCB. The PCB of the antenna module is connected with the main PCB through the coaxial cable by using the coaxial cable connector 695, and the coaxial cable is used mainly for transmission and reception RF signal delivery. Power or other control signals may be delivered through the B-to-B connector 694.

Figure 7:
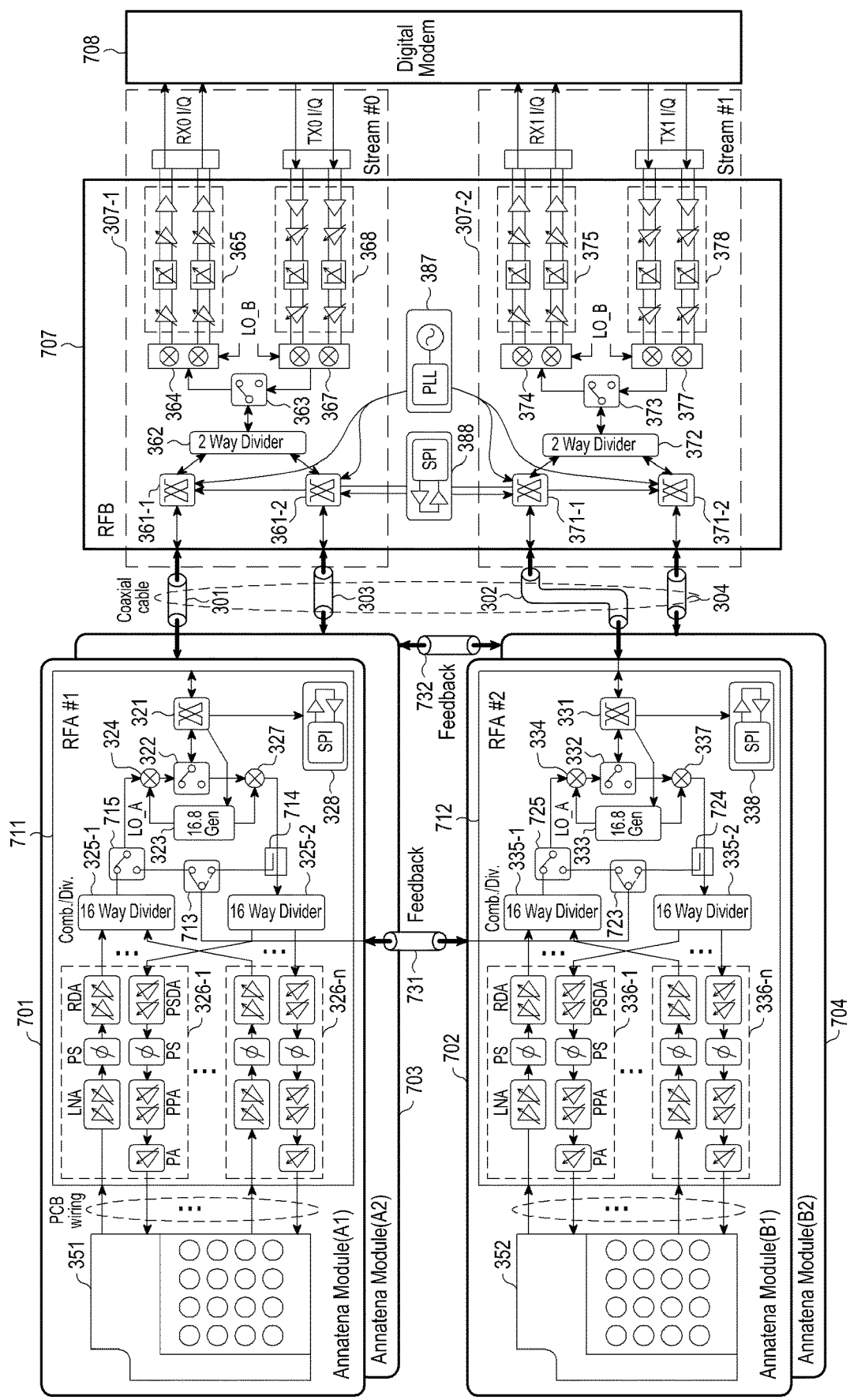
FIG. 7 is a block diagram of a circuit configuration for providing a feedback path of a transmission signal in an electronic device according to an embodiment.
Figure 8:
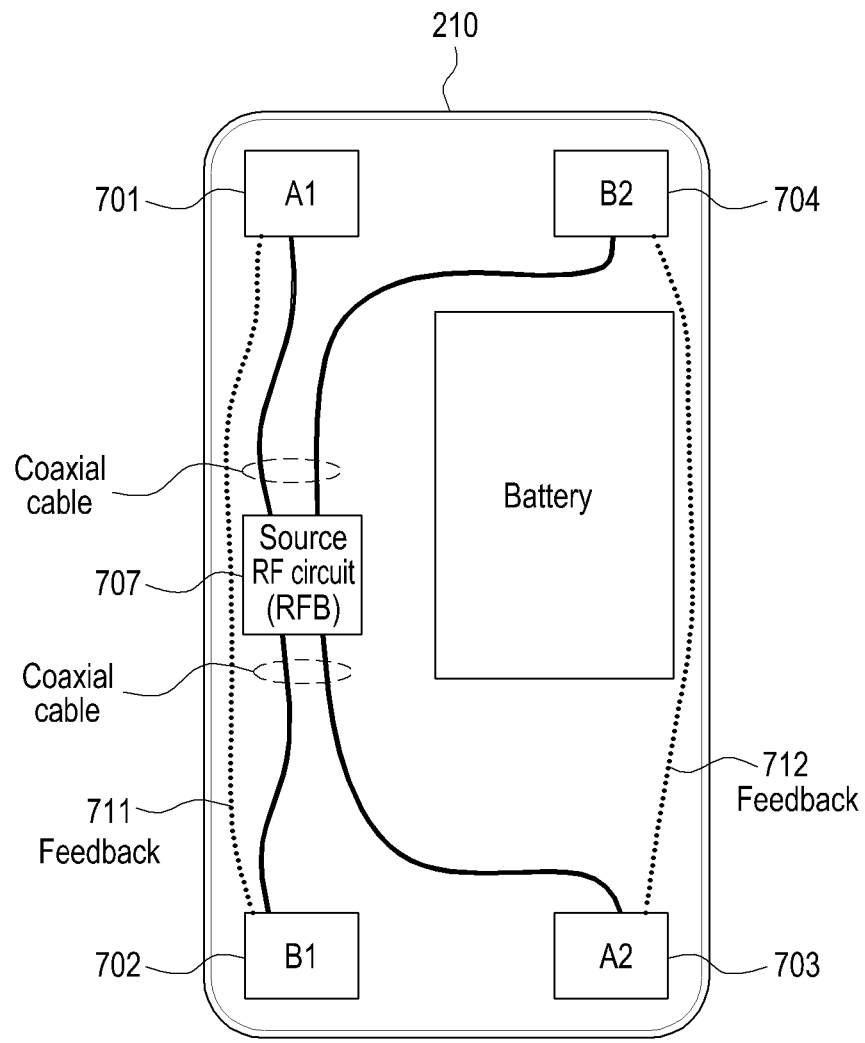
FIG. 8 is an illustration of a layout structural diagram of the block diagram of FIG. 7.

FIG. 7 is a block diagram of a circuit configuration for providing a feedback path of a transmission signal in an electronic device according to an embodiment, showing a structure of a plurality of antenna modules 701, 702, 703, and 704 and a source RF circuit 707. The structure illustrated in FIG. 7 corresponds to the wireless communication module 192 of FIG. 1. FIG. 8 is an illustration of a layout structural of the block diagram of FIG. 7, schematically showing a structure in which the plurality of antenna modules 701, 702, 703, and 704 and the source RF circuit 707 are arranged in the housing 210. In FIG. 8, feedback coaxial cables implementing a main part of a feedback path are indicated by dotted lines.

Referring to FIGS. 7 and 8, each of the plurality of antenna modules 701, 702, 703, and 704 may include an antenna element and an RF circuit. For example, the first antenna module 701 may include a first antenna element 351 and a first RF circuit 711, and the second antenna module 702 may include a second antenna element 352 and a second RF circuit 712. For example, each of a third antenna module 703 and a fourth antenna module 704 may include an antenna element.

The wireless communication circuit for transmitting and receiving an ultra-high frequency radio signal by being electrically connected to the first antenna element 351 and the second antenna element 352 of the first antenna module 701 and the second antenna module 702, respectively, may include a digital modem 708 (e.g., a digital wireless modem). For example, the wireless communication circuit may include the source RF circuit 707 that is electrically connected to the digital modem 708 and is configured to generate an IF signal. The wireless communication circuit may include the first RF circuit 711, that receives a signal transmitted from the source RF circuit 707, for example, an IF signal, to transmit a transmission signal through the first antenna element 351 and the second RF circuit 712 that receives a transmission signal from the RF circuit 707 to transmit the transmission signal through the second antenna element 352. For example, the wireless communication circuit may include RF circuits connected with antenna elements of the third antenna module 703 and the fourth antenna module 704. The digital modem 708 may perform modulation/demodulation and channel encoding/decoding with respect to transmission and reception signals, for example, in a digital stage.

When the first antenna element 351 is arranged at the first position of the housing 210, the second antenna element 352 may be arranged at the second position that is separated from the first position of the housing 210. The first RF circuit 711 may be arranged at a third position that is closer to the first position than to the second position. The second RF circuit 712 may be arranged at a fourth position that is closer to the second position than to the first position. In the example shown in FIGS. 7 and 8, the first antenna element 351 and the first RF circuit 711 are installed adjacent to each other and are coupled through PCB wiring. For example, the second antenna element 352 and the second RF circuit 712 may be coupled through PCB wiring.

The antenna element (e.g., the third antenna element) of the third antenna module 703 may be arranged at a fifth position that is separated from the first position to the fourth position in the housing 210. The antenna element (e.g., the fourth antenna element) of the fourth antenna module 704 may be arranged at a sixth position that is separated from the first position to the fifth position in the housing 210. The RF circuit (e.g., the third RF circuit) of the third antenna module 703 may be arranged at a seventh position that is close to the fifth position. For example, the RF circuit (e.g., the fourth RF circuit) of the fourth antenna module 704 may be arranged at an eighth position that is close to the sixth position.

The source RF circuit 707 is connected with the first to fourth antenna modules 701, 702, 703, and 704 (and antenna elements and RF circuits included therein) and is configured to process transmission and reception signals of the first to fourth antenna modules 701, 702, 703, and 704. Referring to FIG. 8, the source RF circuit 707 may be located, for example, in a relatively central position in the housing 210. For example, the first through fourth antenna modules 701, 702, 703, and 704 may be located spaced apart from each other in a relatively edge portion of the housing 210 in a rectangular shape.

The source RF circuit 707 is connected with the first through fourth antenna modules 701, 702, 703, and 704 (respective RF circuits included therein) through a first electrical path 301, a second electrical path 302, a fourth electrical path 303, and a fifth electrical path 304, respectively. For example, the first, second, fourth, and fifth electrical paths 301, 302, 303, and 304 may be formed using coaxial cables. Respective coaxial cables connecting the source RF circuit 707 with the first through fourth antenna modules 701, 702, 703, and 704 may be designed in their types, lengths, and so forth based on optimal arrangement, signal loss, and phase delay of a signal. At least one of the first, second, fourth, and fifth electrical paths 301, 302, 303, and 304 may be implemented using a coaxial cable.

Referring to FIG. 7, based on efficient mounting, signal loss characteristics, and so forth, a wireless communication circuit supporting an ultra-high frequency band may be implemented as two parts: a part of the source RF circuit 707 and a part of the first and second RF circuits 711 and 712. For example, a chip having a circuit actually implemented therein may be implemented as two parts. According to an embodiment, like the part of the first and second RF circuits 711 and 712, an integrated circuit (IC) implementing a circuit configuration that is included in a front end of an antenna element to amplify transmission and received signals may be referred to as a front-end RF IC (RF front-end IC, a so-called RFA). For example, an IC implementing a circuit configuration that generates an IF signal and so forth, like the part of the source RF circuit 707, may be referred to as a rear-end RF IC (analog baseband (ABB) or IF IC, a so-called RFB).

The first RF circuit 711 RFA #1 may have a transmission (TX) path and a reception (RX) path to transmit and receive an ultra-high frequency radio signal in a time-division multiple access (TDMA) manner. The first RF circuit 711 may include a transmission/reception transition switch 322 for selectively connecting to one of the transmission path and the reception path and at least one RF transmission/reception signal processing circuits 326-1, . . . , 326-n implementing at least a part of the transmission path and the reception path.

In the example illustrated in FIG. 7, the first antenna element 351 may be, for example, a radiation element array (4×4 radiation element array) including 16 radiation elements. The at least one RF transmission/reception signal processing circuit may include a plurality of, for example, 16 transmission/reception signal processing circuits 326-1, . . . , 326-n to process transmission/reception signals for the respective radiation elements of the first antenna element 351. Between the transmission/reception transition switch 322 and the plurality of transmission/reception signal processing circuits 326-1, . . . , 326-n is provided a combiner 325-1 implemented as, for example, a 16-way combiner/divider, to combine reception signals of the respective reception paths of the 16 transmission/reception signal processing circuits 326-1, . . . , 326-n. A divider 325-2 implemented as, for example, a 16-way combiner/divider, may also be provided to divide transmission signals through the respective transmission paths of the 16 transmission/reception signal processing circuits 326-2, . . . , 326-n. Each of the plurality of transmission/reception signal processing circuits 326-1, . . . , 326-n may include a power amplifier (PA) for amplifying a transmission signal, a transmission phase shifter (PS) for changing a phase of a transmission signal for beam-forming, a low-noise amplifier (LNA) for amplifying a reception signal, a reception PS for changing a phase of a reception signal for beam-forming, or the like. A configuration and an installation position of an amplification stage for amplifying transmission and reception signals may be various. For example, a filter for filtering a transmission signal and a reception signal may be further included.

The first RF circuit 711 may include a frequency up/down converter for up-converting a transmission signal (e.g., an IF signal) transmitted from the source RF circuit 707 into a radio signal (an RF signal) in an ultra-high frequency band or down-converting a reception signal in the ultra-high frequency band into an IF signal. For example, the frequency up/down converter may include a local signal generator 323, a reception mixer 324, a transmission mixer 327, or the like. When the source RF circuit 707 is configured to transmit a signal in the ultra-high frequency band for final wireless transmission, the frequency up/down converter may not be included in the first RF circuit 711.

The local signal generator 323 of the frequency up/down converter that may be included in the first RF circuit 711 may be configured to generate a local signal therein, but may also be configured to generate a local signal LO_A by using (e.g., frequency multiplication) a reference local signal transmitted from the source RF circuit 707 for signal synchronization as in an example of FIG. 7. For example, an IF signal may have 11.x GHz (e.g., 11.2 GHz), a reference local signal may have 5.x GHz (e.g., 5.6 GHz), and the local signal generator 323 may generate a wirelessly transmitted ultra-high frequency signal (e.g., 28 GHz) by using a local signal (e.g., 16.8 GHz) resulting from three-time multiplication of the reference local signal. The reference local signal may be between, for example, 5 and 6 GHz. The IF signal may be between, for example, 10 and 12 GHz. The wirelessly transmitted ultra-high frequency signal may be between, for example, 25 and 30 GHz.

The first RF circuit 711 may include a processor 328 for controlling an operation thereof. The processor 328 may be provided with a control signal from the source RF circuit 707 and perform transmission/reception switching control and beam-forming control in the first RF circuit 711. The processor 328 may also receive a control signal from the digital modem 708 or a separate AP.

The signal provided from the source RF circuit 707 to the first RF circuit 711 may include an IF signal, a reference local signal, and a control signal. For example, the signals may be implemented in different frequency bands and thus may be provided as a frequency signal by being combined through a coaxial cable (the first electrical path 301). The first RF circuit 711 may include a signal divider 321 having a filter combiner/divider structure for dividing the frequency-combined signal provided from the source RF circuit 707 into the IF signal, the reference local signal, and the control signal. For example, when the IF signal has 11.2 GHz and the reference local signal has 5.6 GHz, the control signal may be designed to have 2 GHz or lower. The signal divider 321 may be a triplexer for frequency-dividing/combining, for example, the IF signal, the reference local signal, and the control signal.

The second RF circuit 712 RFA #2 may have a configuration corresponding to the first RF circuit 711. The second RF circuit 712 RFA #2 may include a transmission/reception transition switch 332 for selectively connecting to one of the transmission path and the reception path and at least one RF transmission/reception signal processing circuits 336-1, ..., 336-n implementing at least a part of the transmission path and the reception path.

When the second antenna element 352 is implemented as a radiation element array (4×4 radiation element array) including 16 radiation elements, the at least one RF transmission/reception signal processing circuits may include 16 transmission/reception signal processing circuits 336-1, ..., 336-n. Between the transmission/reception transition switch 332 and the plurality of transmission/reception signal processing circuits 336-1, ..., 336-n is provided a combiner 335-1 and a divider 335-2 for dividing and combining 16 transmission/reception signals.

The second RF circuit 712 may include a frequency up/down converter for up-converting an IF signal transmitted from the source RF circuit 707 into a signal in an ultra-high frequency band or down-converting a reception signal in the ultra-high frequency band into an IF signal. The frequency up/down converter may include, for example, a local signal generator 333, a reception mixer 334, a transmission mixer 337, or the like.

The second RF circuit 712 may include a processor 338 for controlling an operation thereof. For example, the second RF circuit 712 may include a signal divider 331 having a filter combiner/divider structure for dividing the frequency-combined signal provided from the source RF circuit 707 into the IF signal, the reference local signal, and the control signal.

RF circuits included in the third antenna module 703 and the fourth antenna module 704 may include configurations corresponding to the first RF circuit 711 and the second RF circuit 712.

The source RF circuit 707 may include a first source RF circuit 307-1 and a second source RF circuit 307-2 for processing transmission/reception signals Stream #0 and Stream #1 having first frequencies (A frequencies) A1 and A2, second frequencies (B frequencies) B1 and B2, respectively, for MIMO implementation. For example, the source RF circuit 707 may include a reference local signal generator 387 that generates a reference local signal having 5.6 GHz and a processor 388 for controlling an operation of the source RF circuit 307.

The first source RF circuit 307-1 may include reception ABB (e.g., RXABB) 365 for processing a baseband reception signal, a transmission ABB (e.g., TXABB) 368 for processing a baseband transmission signal, or a transmission/reception transition switch 363 for selective connection to one of the reception ABB 365 and the transmission ABB 368.

The transmission ABB 368 may receive I/Q signals converted by a digital-to-analog converter (DAC) from the digital modem 708 and perform filtering, amplification, or the like. The transmission ABB 368 may include, for example, a flexible low pass filter (FLPF), a programmable gain-controlled amplifier (PGCA), or the like.

The reception ABB 365 may perform filtering and amplification of the I/Q signals converted into the baseband, perform digital conversion through an analog-to-digital converter (ADC), and provide the result to the digital modem 708. The reception ABB 365 may include, for example, an FLPF, a PGCA, or the like.

Between the transmission/reception transition switch 363 and the transmission ABB 368 is provided a frequency-up converter 367 for frequency-up-converting a baseband transmission signal output from the transmission ABB 368 into an IF signal by using the reference local signal (e.g., doubling) generated by the reference local signal generator 387. Between the transmission/reception transition switch 363 and the reception ABB 365 is provided a frequency-down converter 364 for converting the received IF signal into a baseband signal.

The first source RF circuit 307-1 may be configured to deliver transmission/reception signals to the first antenna module 701 and the third antenna module 703 for diversity implementation. For example, a connection path between the transmission/reception transition switch 363 and the first antenna module 701 and the third antenna module 703 may include a combiner/divider 362 that may be implemented as a 2-way combiner/divider. In another example, the connection path between the transmission/reception transition switch 363 and the first antenna module 701 and the third antenna module 703 may include a first signal combiner 361-1 and a second signal combiner 361-2 having a filter combiner/divider structure to combine a reference local signal (e.g., 5.6 GHz) generated by the reference local signal generator 387, an IF signal (e.g., 11.2 GHz), and a control signal (e.g., 2 GHz) generated in the processor 388.

The second source RF circuit 307-2 may have a configuration that is the same as or similar to the first source RF circuit 307-1, except that the second RF circuit 307-2 is connected with the second antenna module 702 and the fourth antenna module 704 and performs signal processing. For example, the second source RF circuit 307-2 may include a reception ABB 375 for processing a baseband reception signal, a transmission ABB 378 for processing a baseband transmission signal, or a transmission/reception transition switch 373 for selective connection to one of the reception ABB 375 and the transmission ABB 378.

In the second source RF circuit 307-2, a frequency-up converter 377 may be included between the transmission/reception transition switch 373 and the transmission ABB 378. In the second source RF circuit 307-2, a frequency-down converter 374 may be included between the transmission/reception transition switch 373 and the reception ABB 375. A connection path between the transmission/reception transition switch 373 and the second antenna module 702 and the fourth antenna module 704 may include a combiner/divider 372. For example, the connection path between the transmission/reception transition switch 373 and the second antenna module 702 and the fourth antenna module 704 may include a first signal combiner 371-1 and a second signal combiner 371-2 to combine a reference local signal, an IF signal, and a control signal.

The first through fourth RF circuits 711, 712, . . . , of the first through fourth antenna modules 701, 702, 703, and 704 and the source RF circuit 707 may be configured as described above. However, such configurations are merely examples, and various circuit configurations for generating, converting, amplifying or filtering an IF frequency and an RF frequency in a general wireless communication technique may be added or changed.

The source RF circuit 707 may selectively operate any one of a group of the first antenna module 701 and the third antenna module 703 and a group of the second antenna module 702 and the fourth antennal module 704, based on a current propagation environment, transmission characteristics, and so forth, according to MIMO. For example, any one of the first RF circuit 711 of the first antenna module 701 and the second RF circuit 712 of the second antenna module 702 may operate selectively (e.g., alternately). For example, any one of a third RF circuit of the third antenna module 703 and a fourth RF circuit of the fourth antenna module 704 may operate selectively (e.g., alternately).

To form a feedback path of a transmission signal of the first antenna module 701 and the second antenna module 702, a third electrical path 731 (e.g., a first feedback electrical path) connecting the first RF circuit 711 of the first antenna module 701 with, the second RF circuit 722 of, the second antenna module 702 may be formed. The third electrical path 731 may be implemented as, for example, a coaxial cable.

The first RF circuit 711 of the first antenna module 701 may be configured to transmit a feedback signal (e.g., a first feedback signal) associated with a transmission signal thereof to the source RF circuit 707 through an electrical path connecting the second antenna module 702 with the source RF circuit 707, for example, the second electrical path 302, by using the third electrical path 731. For example, the second RF circuit 712 of the second antenna module 702 may be configured to transmit a feedback signal (e.g., a second feedback signal) associated with a transmission signal thereof to the source RF circuit 707 through an electrical path connecting the first antenna module 701 with the source RF circuit 707, for example, the first electrical path 301, by using the third electrical path 731.

The feedback signal of the first RF circuit 711 of the first antenna module 701 may be transmitted to the source RF circuit 707 through the second RF circuit 712 of the second antenna module 702, and the feedback signal of the second RF circuit 712 of the second antenna module 702 may be transmitted to the source RF circuit 707 through the first RF circuit 711 of the first antenna module 701. This operation may be performed based on the operation in which the source RF circuit 307 selectively operates the first antenna module 701 (or the third antenna module 703) and the second antenna module 702 (or the fourth antenna module 704). For example, when the first RF circuit 711 performs transmission/reception operations, the second RF circuit 712 does not perform transmission/reception operations, such that the feedback signal of the first RF circuit 711 may be delivered using the second RF circuit 712.

The first RF circuit 711 may include a first coupler 714 included in a wireless signal transmission path (e.g., a first RF transmission path), a first switch 713 electrically connected to the first coupler 714 and a first end of the third electrical path 731, or a second switch 715 included in a wireless signal reception path (a so-called first RF reception path). The second switch 715 may be electrically connected, for example, to the first switch 713. The first switch 713 or the second switch 715 may be, for example, a single-pole double-throw (SPDT) switch.

The first coupler 714 may be installed in a transmission line between the transmission/reception transition switch 322 and the divider 325-2 on a transmission signal path of the first RF circuit 711, and may couple a part of signals on the transmission line to branch and output the same as a first feedback signal. The second switch 715 may be installed in, for example, a transmission line between the reception mixer 324 and the combiner 325-1 on the reception signal path of the first RF circuit 711.

The first RF circuit 711 may be configured to deliver the first feedback signal from the first coupler 714 to the second RF circuit 712 through the first switch 713 and the third electrical path 731, while transmitting a transmission signal through the first antenna element 351. For example, the first feedback signal of the first RF circuit 711 delivered to the second RF circuit 712 may be frequency-down converted into the IF frequency by the local signal generator 333 and the reception mixer 334 of the second RF circuit 712.

Figure 9:
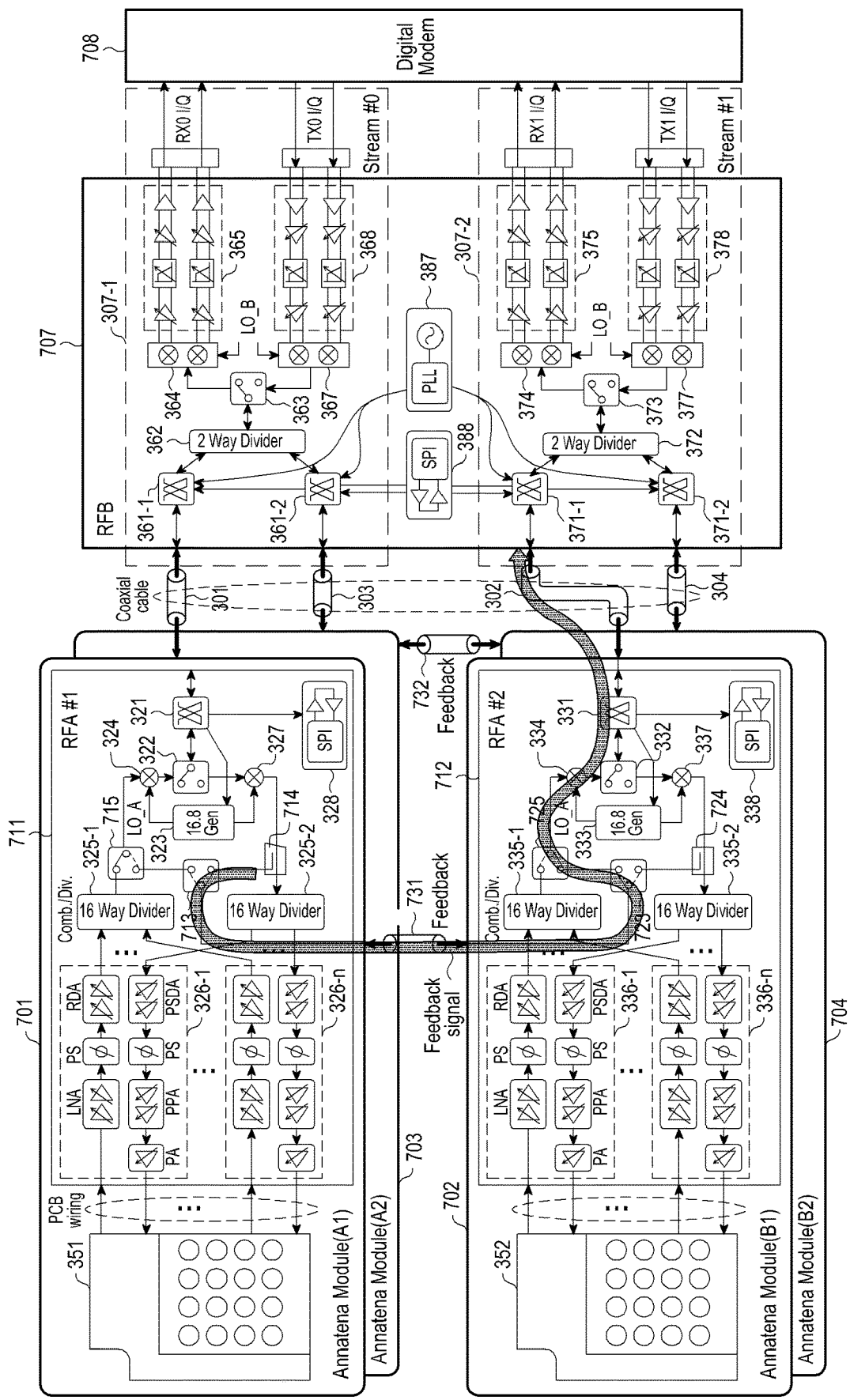
FIG. 9 is an illustration of a path in which a transmission signal is fed back in the block diagram of FIG. 7.

To form a first feedback signal delivery path of the first RF circuit 711, a switch path of the first switch 713 of the first RF circuit 711 and a third switch 723 and a fourth switch 725 of the second RF circuit 712 may be set. For example, the first feedback signal delivery path of the first RF circuit 711 is illustrated by a hatched thick arrow in FIG. 9.

The second RF circuit 712 may include a second coupler 724 included in a wireless signal transmission path (e.g., a second RF transmission path), the third switch 723 electrically connected to the second coupler 724 and a second end of the third electrical path 731, or the fourth switch 725 included in a wireless signal reception path (a so-called second RF reception path). The second coupler 724 may couple a part of transmission signals of the second RF circuit 712 and branch and output the same as the second feedback signal. The fourth switch 725 may be electrically connected, for example, to the third switch 723. The third switch 723 or the fourth switch 725 may be, for example, an SPDT switch.

Figure 10:
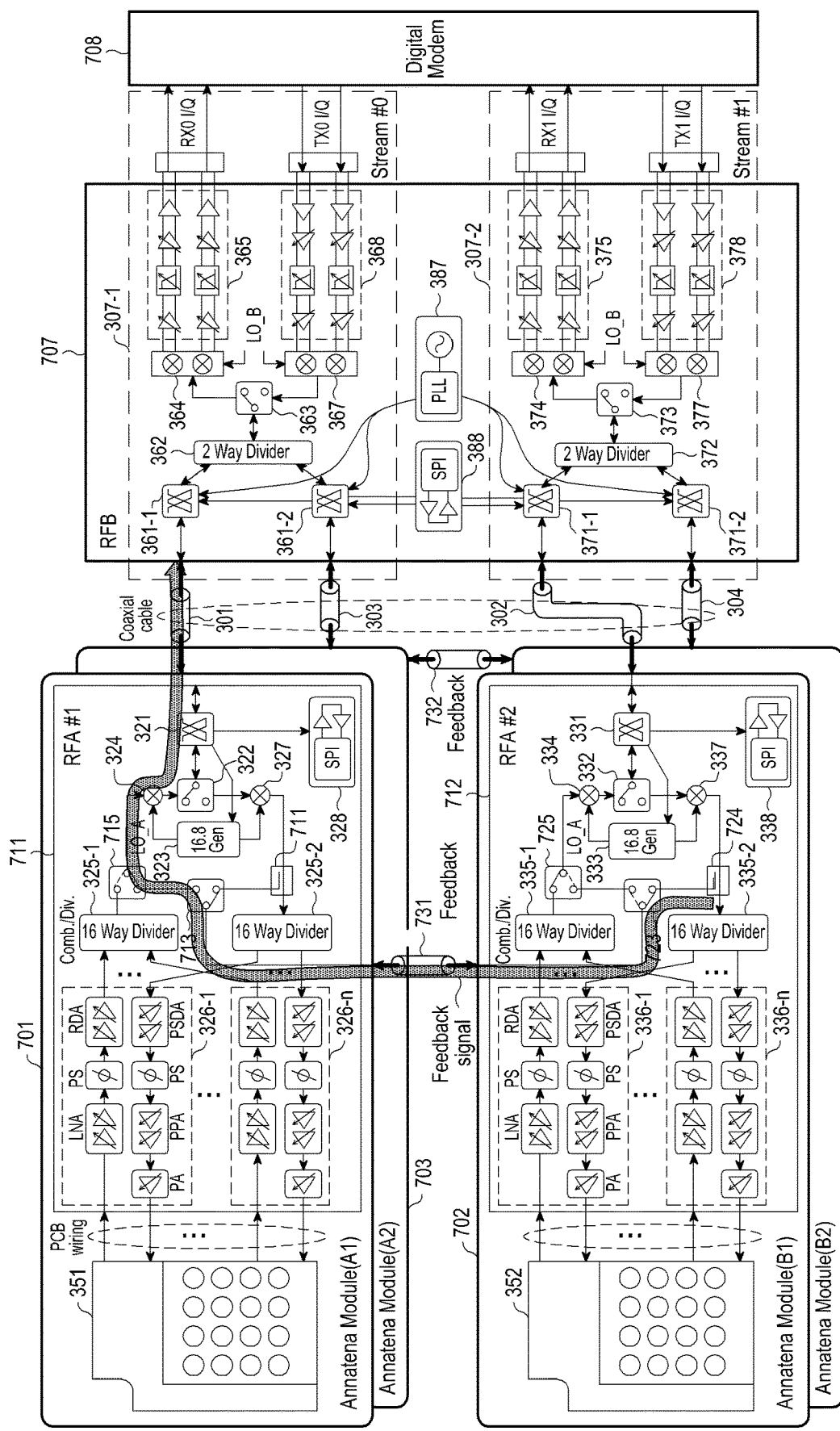
FIG. 10 is an illustration of a path in which a transmission signal is fed back in the block diagram of FIG. 7.

The second coupler 724 may be installed in a transmission line between the transmission/reception transition switch 332 and the divider 335-2 on the transmission signal path of the second RF circuit 712. The fourth switch 725 may be installed in, for example, a transmission line between the reception mixer 334 and the combiner 335-1 on the reception signal path of the second RF circuit 712. The second RF circuit 712 may be configured to deliver the second feedback signal from the second coupler 724 to the first RF circuit 711 through the third switch 723 and the third electrical path 731, while transmitting a transmission signal through the second antenna element 352. The first RF circuit 711 may deliver the second feedback signal provided from the second RF circuit 712 to the source RF circuit 707 through the first electrical path 301 via the first switch 713 and the second switch 715. For example, the second feedback signal of the second RF circuit 712 delivered to the first RF circuit 711 may be frequency-down converted into the IF frequency by the local signal generator 323 and the reception mixer 324 of the first RF circuit 711. For example, the second feedback signal delivery path of the second RF circuit 712 is illustrated by a hatched thick arrow in FIG. 10.

Between the third antenna module 703 and the fourth antenna module 704 is formed a sixth electrical path 732 (e.g., a second feedback electrical path) that may be implemented as a coaxial cable. For example, between the third antenna module 703 and the fourth antenna module 704 may be provided a configuration that is the same as or similar with a configuration for delivering a feedback signal between the first antenna module 701 and the second antenna module 702 and thus may perform a feedback operation. For example, a third RF circuit of the third antenna module 703 may transmit a third feedback signal associated with a transmission signal thereof to the source RF circuit 707 through the sixth electrical path 732 and an electrical path connecting the fourth antenna module 704 with the source RF circuit 707, for example, the fifth electrical path 304. For example, a fourth RF circuit of the fourth antenna module 704 may be configured to transmit a fourth feedback signal associated with a transmission signal thereof to the source RF circuit 707 through the sixth electrical path 732 and an electrical path connecting the third antenna module 703 with the source RF circuit 707, for example, the fourth electrical path 303.

In the embodiment illustrated in FIGS. 7 to 10, to form a feedback path of a transmission signal for the four antenna modules 701, 702, 703, and 704, a separate feedback port is not needed in the source RF circuit 707, and a separate frequency-down converter for frequency-down converting a feedback signal may not be included in the plurality of antenna modules 701, 702, 703, and 704. Thus, a configuration according to the embodiment illustrated in FIG. 7 may allow a simple circuit configuration and a simple design, and make it easy to implement a feedback coaxial cable in a mounting space inside the electronic device.

Figure 11:
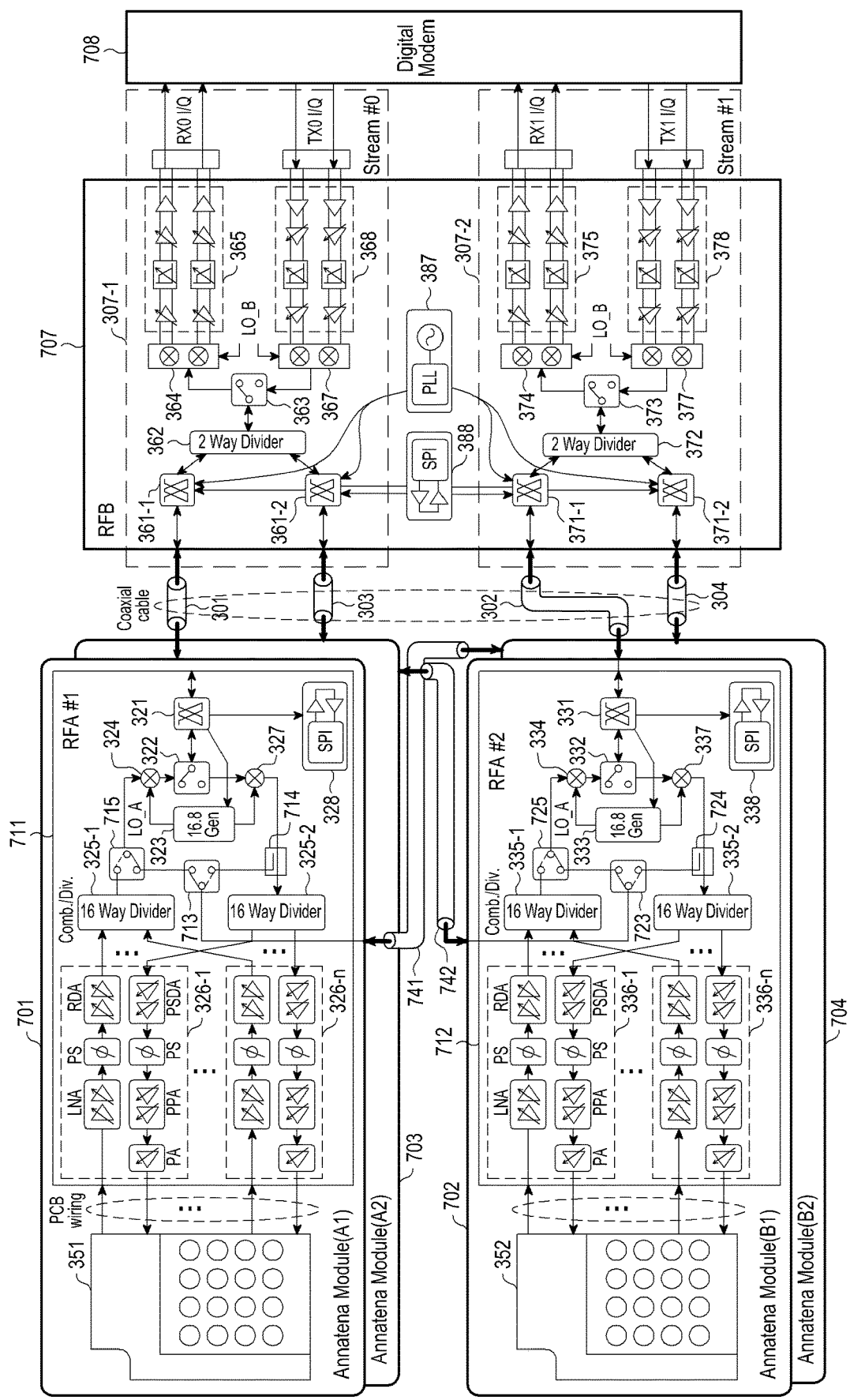
FIG. 11 is a block diagram of a modified structure of a circuit configuration for providing a feedback path of a transmission signal in an electronic device according to an embodiment.
Figure 12:
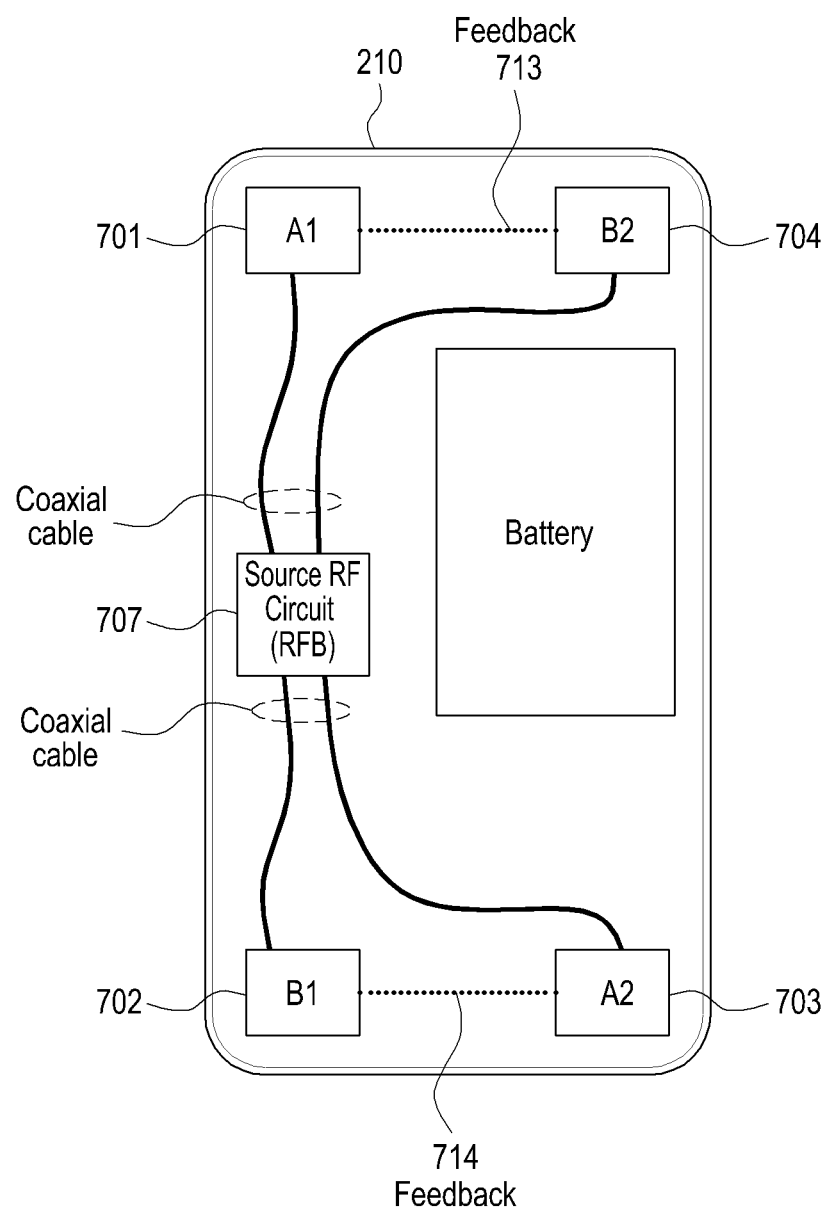
FIG. 12 is an illustration of a layout structural diagram of the block diagram of FIG. 11.

FIG. 11 is a block diagram of a modified structure of a circuit configuration for providing a feedback path of a transmission signal in an electronic device according to an embodiment. FIG. 12 is an illustration of a layout structural diagram of the circuit configuration of FIG. 11, schematically showing a structure in which the plurality of antenna modules 701, 702, 703, and 704 and the source RF circuit 707 are arranged in the housing 210. In FIG. 12, feedback coaxial cables implementing a main part of a feedback path are indicated by dotted lines.

Internal circuit configurations of the first through fourth antenna modules 701, 702, 703, and 704 and the first through fourth RF circuits 711, 712, . . . thereof according to the embodiment illustrated in FIGS. 11 and 12 may be the same as or similar with that illustrated in FIG. 7.

Between the first antenna module 711 and the fourth antenna module 714 is formed the third electrical path 741 (e.g., the first feedback electrical path). For example, between the second antenna module 712 and the third antenna module 713 is formed the sixth electrical path 742 (e.g., the second feedback electrical path). For example, the feedback signal of the first RF circuit 711 of the first antenna module 701 may be transmitted to the source RF circuit 707 through the fourth RF circuit of the fourth antenna module 704, and the feedback signal of the second RF circuit 712 of the second antenna module 702 may be transmitted to the source RF circuit 707 through the third RF circuit of the third antenna module 703.

Figure 13:
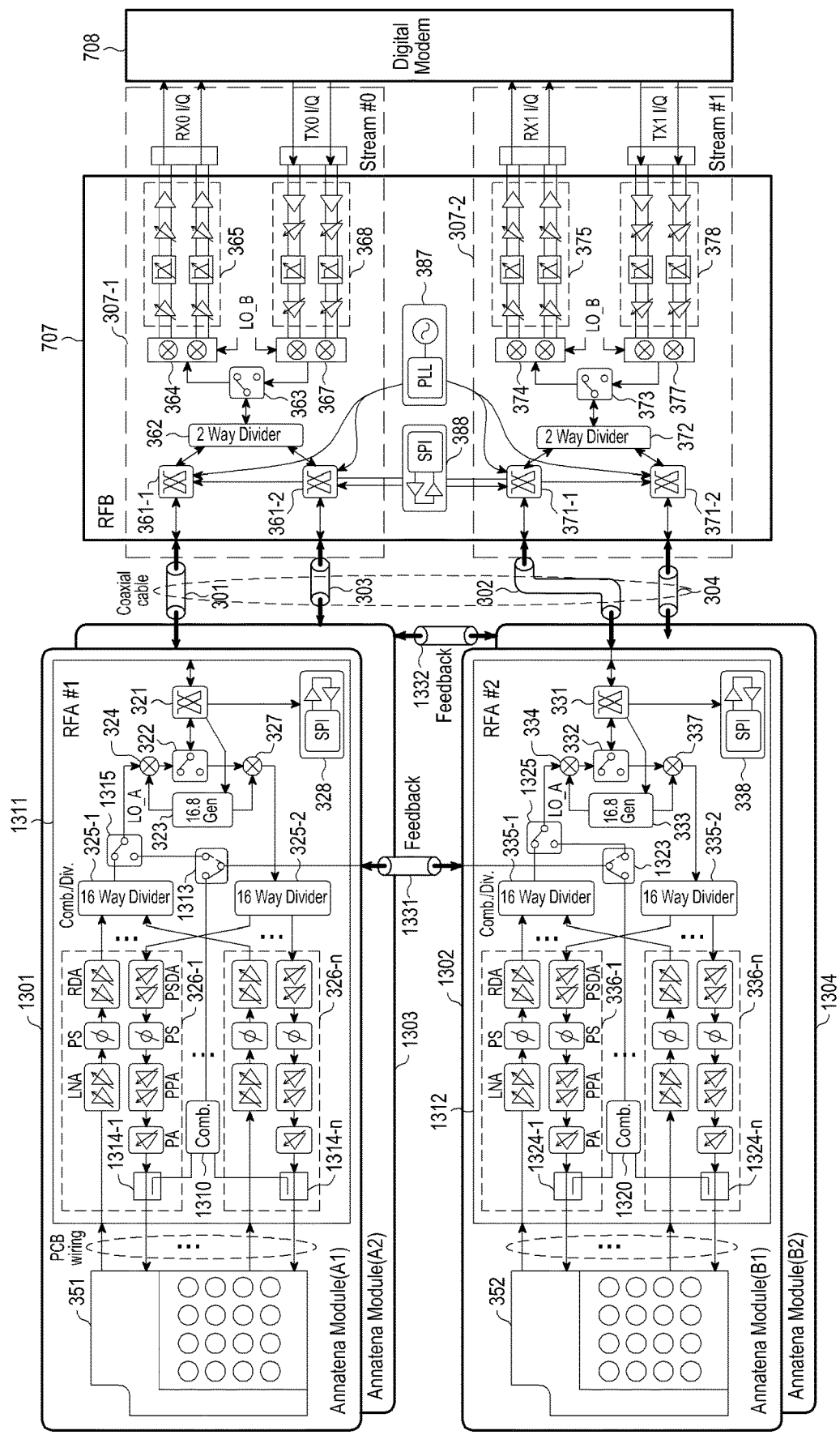
FIG. 13 is a block diagram of a circuit configuration for providing a feedback path of a transmission signal in an electronic device according to an embodiment.

FIG. 13 is a block diagram of a circuit configuration for providing a feedback path of a transmission signal in an electronic device according to an embodiment, showing a structure of a plurality of antenna modules 1301, 1302, 1303, and 1304 and a source RF circuit 707, which is similar with that illustrated in the embodiment of FIG. 7.

Referring to FIG. 13, the antenna module 1301 may include the first antenna element 351 and the first RF circuit 1311. The second antenna module 1302 may include the second antenna element 352 and the second RF circuit 1312. The first through fourth antenna modules 1301, 1302, 1303, and 1304 (and internal RF circuits thereof) may be connected with the source RF circuit 707 through coaxial cables forming respective electrical paths. Basic configurations and operations for processing transmission/reception signals in the respective RF circuits 1311, 1312, . . . , and the source RF circuit 707 may be the same as or similar with corresponding configurations and operations shown in FIG. 7.

To form a feedback path of a transmission signal of each of the first antenna module 1301 and the second antenna module 1302, a third electrical path 1331 connecting (the first RF circuit 1311 of) the first antenna module 1301 with (the second RF circuit 1322 of) the second antenna module 1302 may be formed. For example, between the third antenna module 1303 and the fourth antenna module 1304 is formed a sixth electrical path 1332. Such a structure may be the same as or similar with that of the embodiment illustrated in FIG. 7.

The first RF circuit 1311 may include a first coupler included in a wireless signal transmission path, a first switch 1313 electrically connected to the first coupler and a first end of the third electrical path 1331, or a second switch 1315 included in a wireless signal reception path.

The first coupler may include a plurality of (e.g., 16) sub couplers 1314-1, . . . , 1314-n for coupling a part of a transmission signal for each of a plurality of (e.g., 16) radiation elements included in the first antenna element 351 and branching the same, or a combiner 1310 for combining signals of the plurality of the sub couplers 1314-1, . . . , 1314-n. Each of the plurality of sub couplers 1314-1, . . . , 1314-n may be installed in an immediately previous stage of the first antenna element 351 (e.g., between the plurality of transmission/reception signal processing circuits 326-1, . . . , 326-n and the first antenna element 351).

The second RF circuit 1312 may include a second coupler included in the wireless signal transmission path, a second switch 1323 electrically connected to the first coupler and a second end of the third electrical path 1331, or a fourth switch 1325 included in the wireless signal reception path.

The second coupler may include a plurality of (e.g., 16) sub couplers 1324-1, . . . , 1324-n for coupling a part of a transmission signal for each of a plurality of (e.g., 16)

radiation elements included in the second antenna element 352 and branching the same, or a combiner 1320 for combining signals of the plurality of the sub couplers 1324-1, ..., 1324-n.

A coupling structure of a feedback path according to the embodiment illustrated in FIG. 13 may provide a feedback signal with respect to a radio signal finally transmitted from an immediately previous stage of an antenna element, thereby providing a more accurate feedback signal in relation to a transmission signal depending on circumstances.

Figure 14:
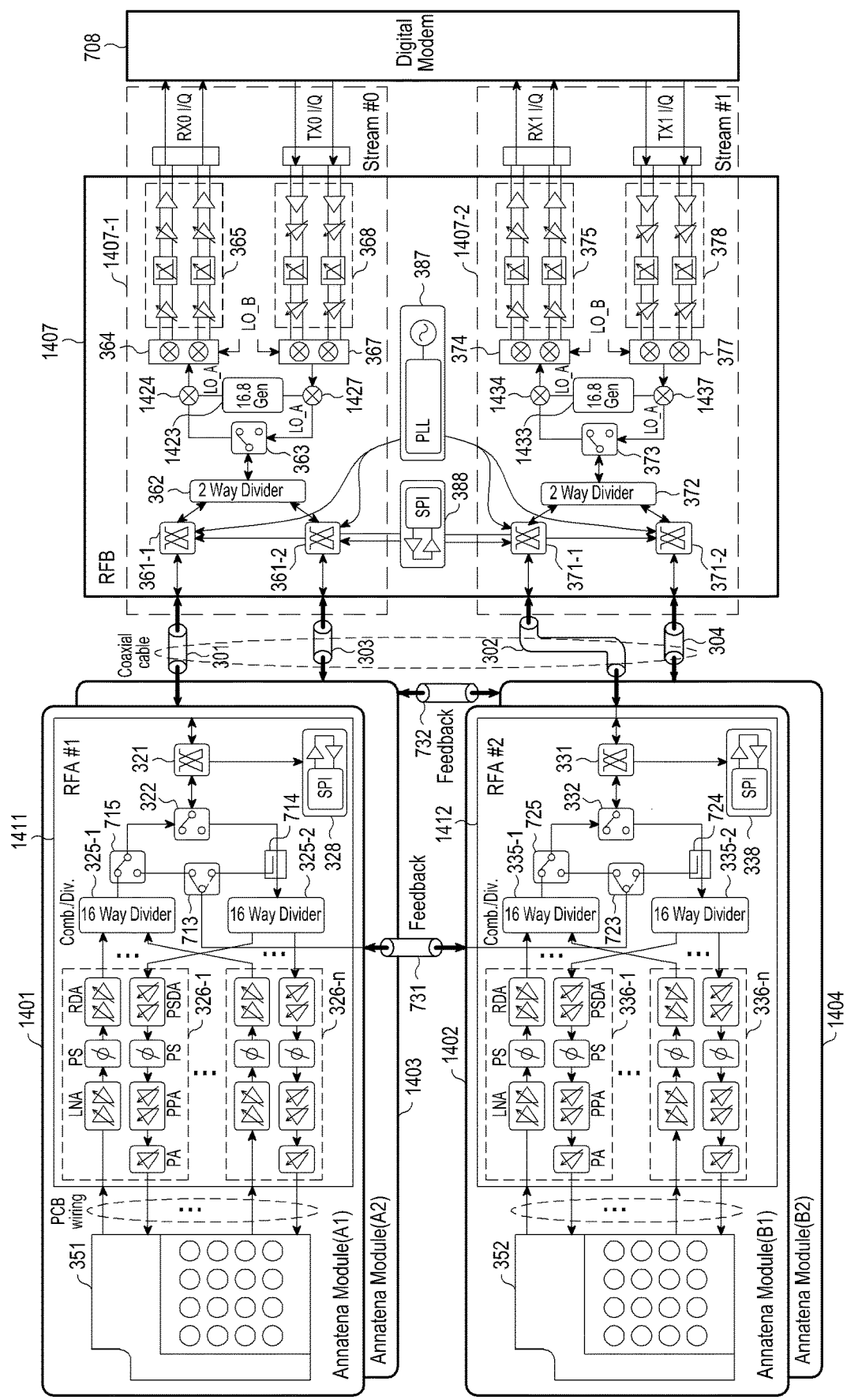
FIG. 14 is a block diagram of a circuit configuration for providing a feedback path of a transmission signal in an electronic device according to an embodiment.

FIG. 14 is of block diagram of a circuit configuration for providing a feedback path of a transmission signal in an electronic device according to an embodiment, showing a structure of a plurality of antenna modules 1401, 1402, 1403, and 1404 and a source RF circuit 1407, which is relatively similar with that illustrated in the embodiment of FIG. 7.

Referring to FIG. 14, instead of a source RF circuit 1407 generating an IF signal (e.g., 11.2 GHz) and transmitting the same to each of antenna modules 1401, 1402, 1403, and 1404, the source RF circuit 1407 performs frequency-up conversion with respect to the IF signal into an ultra-high frequency band (e.g., 28 GHz) for final wireless transmission, and then generates an RF signal, and then transmits the generated RF signal to each of the antenna modules 1401, 1402, 1403, and 1404. First through fourth RF circuits 1411, 1412, ..., in the first through fourth antenna modules 1401, 1402, 1403, and 1404 may perform transmission/reception signal processing without conversion of transmission/reception frequencies.

Referring to FIG. 14, for example, the first and second RF circuits 1411 and 1412 in the first and second antenna modules 1401 and 1402 may not include frequency-up/down converters for frequency-up/down conversion. In another example, a first source RF circuit 1407-1 of the source RF circuit 1407 may include an additional local signal generator 1423, a reception mixer 1424, a transmission mixer 1427, and so forth to convert a transmission IF signal back into an RF signal and to convert a reception RF signal into an IF signal. A second source RF circuit 1407-2 of the source RF circuit 1407 may also include an additional local signal generator 1433, a reception mixer 1434, a transmission mixer 1437, and so forth.

In addition, in the embodiment illustrated in FIG. 14, related components including the third electrical path 731 for forming a feedback path of a transmission signal between the first antenna module 1401 and the second antenna module 1402 and related components including the sixth electrical path 732 for forming a feedback path of a transmission signal between the third antenna module 1403 and the fourth antenna module 1404 may be the same as or similar with the structure of the embodiment illustrated in FIG. 7.

Figure 15:
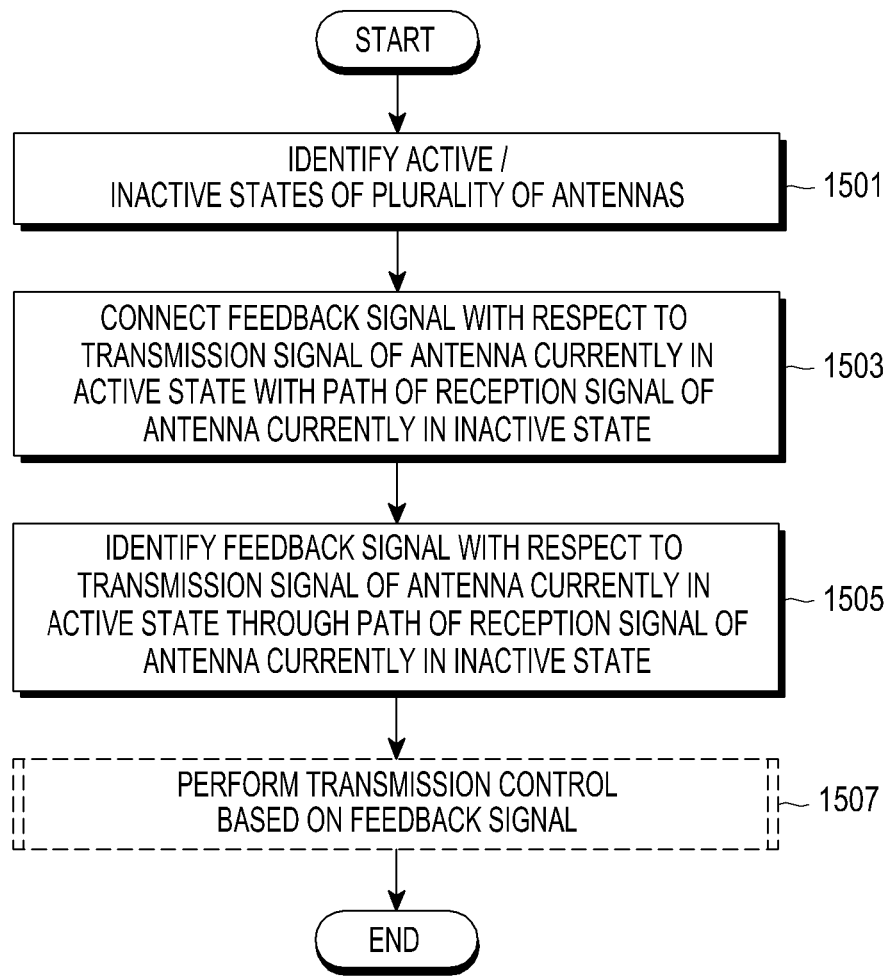
FIG. 15 is a flowchart of a method of providing a feedback path of a transmission signal in an electronic device according to an embodiment.

FIG. 15 is a flowchart of a method of providing a feedback path of a transmission signal in an electronic device according to an embodiment. The operations illustrated in FIG. 15 may be performed under control of, for example, a source RF circuit, a digital modem, or other separate external control processes.

Referring to FIG. 15, the electronic device identifies an active/inactive state of a plurality of antennas (e.g., a plurality of antenna modules or a plurality of antenna elements) in step (also can be referred to be operation) 1501.

In step 1503, the electronic device connects a feedback signal with respect to a transmission signal of an antenna currently in the active state with a path of a reception signal of an antenna currently in the inactive state, based on the identified result.

In step 1505, the electronic device identifies the feedback signal with respect to the transmission signal of the antenna currently in the active state through the connected path of the reception signal of the antenna in the inactive state.

In step 1507, the electronic device performs associated transmission control operations such as output magnitude adjustment or the like with respect to the transmission signal based on the identified feedback signal.

In the above operations, the electronic device may alternately identify the active/inactive states of the plurality of antennas.

While embodiments of the present disclosure have been described, various modifications or changes may be made without departing the scope of the present disclosure. Moreover, in the foregoing description, at least some components in each of various embodiments may be applied to other embodiments, and may also be omitted depending on circumstances.

For example, while an IF frequency band and an RF frequency band are described as, for example, an 11 GHz band and a 28 GHz band in various embodiments of the present disclosure, the RF frequency band may also be applied to process a radio signal in various bands such as a 38 GHz band, a 60 GHz band, and so forth in various embodiments.

Furthermore, in the foregoing description, each antenna module is described as transmitting and receiving an RF signal in the same frequency band, but various embodiments of the present disclosure may also be applied to a case with different frequency bands. For example, when the first antenna module processes 28 GHz and the second antenna module processes 39 GHz and they process an RF signal obtained by multiplication by a reference local signal having the same frequency, then a feedback path therebetween may also be formed.

An antenna element to which various embodiments is applied is implemented as a patch-type radiation element array in the foregoing description, but the radiation element array may be a dipole type or a hybrid type in which a patch type and a dipole type are partially implemented. In addition, an electronic device may also be provided in which a housing is at least partially formed of a metal material and at least a part of the metal material part is implemented with a plurality of antenna elements, and also in this case, at least some of various embodiments may be applied.

According to an embodiment, an electronic device includes the housing 210, the first antenna element 351 arranged at a first position inside or on the housing, the second antenna element 352 arranged at a second position, which is separated from the first position, inside or on the housing, and a wireless communication circuit arranged inside the housing and electrically connected to the first antenna element and the second antenna element, in which the wireless communication circuit includes the digital modem 708, the source RF circuit 707 electrically connected to the digital modem 708 and configured to generate an IF signal, the first RF circuit 711 arranged at a third position closer to the first position than to the second position, the second RF circuit 712 arranged at a fourth position closer to the second position than to the first position, the first RF circuit and the second RF circuit being configured to alternately receive a signal transmitted from the source RF circuit to transmit a transmission signal through the first antenna element and the second antenna element, respectively, a first electrical path between the source RF circuit and the first RF circuit, a second electrical path between the source RF circuit and the second RF circuit, and the third electrical path 731 between the first RF circuit and the second RF circuit, in which the first RF circuit is configured to transmit a first feedback associated with the transmission signal therefrom to the source RF circuit through the third electrical path and the second electrical path, and the second RF circuit transmits a second feedback associated with the transmission signal therefrom to the source RF circuit through the third electrical path and the first electrical path. According to an embodiment, at least one of the first electrical path, the second electrical path, or the third electrical path 731 may include a coaxial cable.

According to an embodiment, the first RF circuit 711 includes a first RF transmission path, a first RF reception path, the first coupler 714 included on the first RF transmission path, the first switch 713 electrically connected to the first coupler and a first end of the third electrical path, and the second switch 715 included on the first RF reception path and electrically connected to the first switch, and the first RF circuit is configured to provide a first feedback signal from the first coupler through the first switch, the third electrical path, and the second electrical path, while transmitting the transmission signal through the first antenna element.

According to a embodiment, the second RF circuit 712 includes a second RF transmission path, a second RF reception path, the second coupler 724 included on the second RF transmission path, the third switch 723 electrically connected to the second coupler and a second end of the third electrical path, and the second switch 725 included on the first RF reception path and electrically connected to the first switch, and the first RF circuit is configured to provide a first feedback signal from the first coupler through the first switch, the third electrical path, and the second electrical path, while transmitting the transmission signal through the first antenna element.

According to an embodiment, at least one of the first switch 713 or the third switch 723 includes an SPDT switch.

According to various embodiments of the present disclosure, the IF signal has a frequency between 5 GHz and 6 GHz, and the transmission signal has a frequency between 25 GHz and 30 GHz.

According to an embodiment, the electronic device may further include a third antenna element arranged at a fifth position, which is separated from the first through fourth positions, inside or on the housing 210 and a fourth second antenna element arranged at a sixth position, which is separated from the first through fifth positions, inside or on the housing, in which the wireless communication circuit includes a third RF circuit arranged at a seventh position that is closest to the fifth position among the first through sixth positions, a fourth RF circuit arranged at an eighth position that is closest to the sixth position among the first through seventh positions, the third RF circuit and the fourth RF circuit being configured to alternately receive a signal transmitted from the source RF circuit to transmit a transmission signal through the third antenna element and the fourth antenna element, respectively, a fourth electrical path between the source RF circuit and the third RF circuit, a fifth electrical path between the source RF circuit and the fourth RF circuit, and the sixth electrical path 732 between the third RF circuit and the fourth RF circuit, in which the third RF circuit may be configured to transmit a third feedback associated with the transmission signal therefrom to the source RF circuit through the sixth electrical path 732 and the fifth electrical path, and the fourth RF circuit may be configured to transmit a fourth feedback associated with the transmission signal therefrom to the source RF circuit 707 through the sixth electrical path and the fourth electrical path.

According to an embodiment, the housing 210 may include a front plate and a rear plate directed in a direction opposite to the front plate, and the housing may have a rectangular shape including a first side having a first length, a second side having a second length longer than the first length, a third side having the first length, and a fourth side having the second length, and the first RF circuit and the second RF circuit may be closer to the first side than to the third side, and the third RF circuit and the fourth RF circuit may be closer to the third side than to the first side.

According to an embodiment, the first RF circuit 711 and the third RF circuit may be arranged diagonally when viewed from a top of the front plate of the housing, and are configured to transmit transmission signals at the same time.

According to an embodiment, the second RF circuit 212 and the fourth RF circuit may be arranged diagonally when viewed from the top of the front plate of the housing, and may be configured not to transmit the transmission signals when the first RF circuit and the third RF circuit transmit the transmission signals.

According to an embodiment, the first antenna element 351 may include a plurality of radiation elements, and the first coupler may include the plurality of sub couplers 1314-1, . . . , 1314-$n$ provided for each of the plurality of radiation elements and the combiner 1310 configured to combine signals of the plurality of sub couplers.

According to an embodiment, the second antenna element 352 may include a plurality of radiation elements, and the second coupler may include the plurality of sub couplers 1324-1, . . . , 1324-$n$ provided for each of the plurality of radiation elements of the second antenna and the combiner 1320 configured to combine signals of the plurality of sub couplers.

According to an embodiment, the source RF circuit 707 may be configured to generate an RF signal by using the IF signal.

According to an embodiment, a method for providing a feedback path of a transmission signal in an electronic device includes operation 1501 of identifying active/inactive states of a plurality of antennas, operation 1503 of connecting a feedback signal with respect to a transmission signal of an antenna currently in the active state with a path of a reception signal of an antenna currently in the inactive state, and operation 1505 of identifying the feedback signal with respect to the transmission signal of the antenna currently in the active state through the path of the reception signal of the antenna currently in the inactive state.

According to an embodiment, the active/inactive states of the plurality of antennas may be set alternately.

According to an embodiment, an apparatus for providing a feedback path of a transmission signal in an electronic device includes a first antenna element, a second antenna element, a first RF circuit configured to process a radio signal transmitted and received through the first antenna element, a second RF circuit configured to process a radio signal transmitted and received through the second antenna element, the first feedback electrical path 731 electrically connecting the first RF circuit with the second RF circuit, the first coupler 714 included on the first RF circuit, the first switch 713 electrically connected to the first coupler and a first end of the first feedback electrical path, the second switch 715 included on a reception path of the first RF circuit and electrically connected to the first switch, the second coupler 724 included on a transmission path of the second RF circuit, the third switch 723 electrically connected to the second coupler and a second end of the first feedback electrical path, and the fourth switch 725 included on a reception path of the second RF circuit and electrically connected to the third switch.

According to an embodiment, transmission operations of the first RF circuit 711 and the second RF circuit 712 may be performed alternately, and the first RF circuit 711 may be configured to provide a first feedback signal coupled from the first coupler to the second RF circuit 712 through the first switch and the first feedback electrical path, while transmitting the transmission signal through the first antenna element, and the second RF circuit 712 is configured to receive the first feedback signal provided from the first RF circuit on a reception path of the second RF circuit through the third switch and the fourth switch.

According to an embodiment, the second RF circuit 712 may be configured to provide a second feedback signal coupled from the second coupler to the first RF circuit through the third switch and the first feedback electrical path, while transmitting the transmission signal through the second antenna element 352, and the first RF circuit 711 may be configured to receive the second feedback signal provided from the second RF circuit on a reception path of the first RF circuit through the first switch and the second switch.

According to an embodiment, the first feedback path 731 may include a coaxial cable.

According to an embodiment, at least one of the first through fourth switches 713, 715, 723, and 725 may include an SPDT switch.

The electronic device and the method for providing the feedback path of the transmission signal in the electronic device may reduce some components for processing an ultra-high frequency signal (and a feedback signal), thereby reducing a loss in an internal space of the electronic device and improving the mounting property of the feedback path.

While the present disclosure has been particularly shown and described with reference to embodiments thereof, it is clearly understood that the same is by way of illustration and example only and is not intended to be taken in conjunction with the present disclosure. It will be understood by those skilled in the art that various changes in form and details may be made therein without departing from the subject matter and scope of the present disclosure as defined by the appended claims and their equivalents.

What is claimed is:

1. An electronic device, comprising:
a housing;
a first antenna element arranged at a first position inside or on the housing;
a second antenna element arranged at a second position, which is separated from the first position, inside or on the housing; and
a wireless communication circuit arranged inside the housing and electrically connected to the first antenna element and the second antenna element,
wherein the wireless communication circuit comprises:
a wireless modem;
a source radio frequency (RF) circuit electrically connected to the wireless modem and configured to generate an intermediate frequency (IF) signal;
a first RF circuit arranged at a third position closer to the first position than to the second position;
a second RF circuit arranged at a fourth position closer to the second position than to the first position, wherein the first RF circuit and the second RF circuit are configured to alternately receive a signal transmitted from the source RF circuit to transmit a transmission signal through the first antenna element and the second antenna element, respectively;
a first electrical path between the source RF circuit and the first RF circuit;
a second electrical path between the source RF circuit and the second RF circuit; and
a third electrical path between the first RF circuit and the second RF circuit,
wherein the first RF circuit is configured to transmit a first feedback associated with the transmission signal therefrom to the source RF circuit through the third electrical path and the second electrical path, and
wherein the second RF circuit is configured to transmit a second feedback associated with the transmission signal therefrom to the source RF circuit through the third electrical path and the first electrical path.

2. The electronic device of claim 1, wherein at least one of the first electrical path, the second electrical path, or the third electrical path comprises a coaxial cable.

3. The electronic device of claim 2, wherein the first RF circuit comprises:
a first RF transmission path;
a first RF reception path;
a first coupler included on the first RF transmission path;
a first switch electrically connected to the first coupler and a first end of the third electrical path; and
a second switch included on the first RF reception path and electrically connected to the first switch, and
wherein the first RF circuit is configured to provide a first feedback signal from the first coupler through the first switch, the third electrical path, and the second electrical path, while transmitting the transmission signal through the first antenna element.

4. The electronic device of claim 3, wherein the second RF circuit comprises:
a second RF transmission path;
a second RF reception path;
a second coupler included on the second RF transmission path;
a third switch electrically connected to the second coupler and a second end of the third electrical path; and
a fourth switch included on the second RF reception path and electrically connected to the third switch, and
wherein the second RF circuit is configured to provide a second feedback signal from the second coupler through the third switch, the third electrical path, the first switch, and the first electrical path, while transmitting the transmission signal through the second antenna element.

5. The electronic device of claim 4, wherein at least one of the first switch or the third switch comprises a single-pole double-throw (SPDT) switch.

6. The electronic device of claim 1, wherein the IF signal has a frequency between 5 GHz and 6 GHz, and the transmission signal has a frequency between 25 GHz and 30 GHz.

7. The electronic device of claim 1, further comprising:
a third antenna element arranged at a fifth position, which is separated from the first, second, third, and fourth positions, inside or on the housing; and
a fourth antenna element arranged at a sixth position, which is separated from the first, second, third, fourth, and fifth positions, inside or on the housing, wherein the wireless communication circuit comprises:
a third RF circuit arranged at a seventh position that is closest to the fifth position among the first, second, third, fourth, fifth, and sixth positions;
a fourth RF circuit arranged at an eighth position that is closest to the sixth position among the first through seventh positions, the third RF circuit and the fourth RF circuit being configured to alternately receive a signal transmitted from the source RF circuit to transmit a transmission signal through the third antenna element and the fourth antenna element, respectively;
a fourth electrical path between the source RF circuit and the third RF circuit;
a fifth electrical path between the source RF circuit and the fourth RF circuit; and
a sixth electrical path between the third RF circuit and the fourth RF circuit,
wherein the third RF circuit is configured to transmit a third feedback associated with the transmission signal therefrom to the source RF circuit through the sixth electrical path and the fifth electrical path, and
the fourth RF circuit is configured to transmit a fourth feedback associated with the transmission signal therefrom to the source RF circuit through the sixth electrical path and the fourth electrical path.

8. The electronic device of claim 7, wherein the housing comprises a front plate and a rear plate directed in a direction opposite to the front plate,
wherein the housing has a rectangular shape comprising a first side having a first length, a second side having a second length greater than the first length, a third side having the first length, and a fourth side having the second length,
wherein the first RF circuit and the second RF circuit are closer to the first side than to the third side, and
wherein the third RF circuit and the fourth RF circuit are closer to the third side than to the first side.

9. The electronic device of claim 8, wherein the first RF circuit and the third RF circuit are arranged diagonally when viewed from a top of the front plate of the housing, and are configured to transmit transmission signals at the same time.

10. The electronic device of claim 9, wherein the second RF circuit and the fourth RF circuit are arranged diagonally when viewed from the top of the front plate of the housing, and are configured not to transmit the transmission signals when the first RF circuit and the third RF circuit transmit the transmission signals.

11. The electronic device of claim 3, wherein the first antenna comprises a plurality of radiation elements, and
the first coupler comprises:
a plurality of sub couplers provided for each of the plurality of radiation elements; and
a combiner configured to combine signals of the plurality of sub couplers.

12. The electronic device of claim 4, wherein the second antenna comprises a plurality of radiation elements, and
the second coupler comprises:
a plurality of sub couplers provided for each of the plurality of radiation elements of the second antenna; and
a combiner configured to combine signals of the plurality of sub couplers.

13. The electronic device of claim 1, wherein the source RF circuit is configured to generate an RF signal by using the IF signal.

14. A method for providing a feedback path of a transmission signal in an electronic device, the method comprising:
identifying active/inactive states of a plurality of antennas;
connecting a feedback signal with respect to a transmission signal of an antenna currently in the active state with a path of a reception signal of an antenna currently in the inactive state; and
identifying the feedback signal with respect to the transmission signal of the antenna currently in the active state through the path of the reception signal of the antenna currently in the inactive state.

15. The method of claim 14, wherein the active/inactive states of the plurality of antennas are set alternately.

16. An apparatus for providing a feedback path in an electronic device, the apparatus comprising:
a first antenna element;
a second antenna element;
a first radio frequency (RF) circuit configured to process a radio signal transmitted and received through the first antenna element;
a second RF circuit configured to process a radio signal transmitted and received through the second antenna element;
a feedback electrical path electrically connecting the first RF circuit with the second RF circuit;
a first coupler included on the first RF circuit;
a first switch electrically connected to the first coupler and a first end of the feedback electrical path;
a second switch included on a reception path of the first RF circuit and electrically connected to the first switch;
a second coupler included on a transmission path of the second RF circuit;
a third switch electrically connected to the second coupler and a second end of the feedback electrical path; and
a fourth switch included on a reception path of the second RF circuit and electrically connected to the third switch,
wherein the first RF circuit and the second RF circuit are configured to perform transmission operations alternately, and
wherein the first RF circuit is further configured to provide a first feedback signal coupled from the first coupler to the second RF circuit through the first switch and the feedback electrical path, while transmitting the transmission signal through the first antenna element.

17. The apparatus of claim 16,
wherein the second RF circuit is further configured to receive the first feedback signal provided from the first RF circuit on a reception path of the second RF circuit through the third switch and the fourth switch.

18. The apparatus of claim 17, wherein the second RF circuit is further configured to provide a second feedback signal coupled from the second coupler to the first RF circuit through the third switch and the first feedback electrical path, while transmitting the transmission signal through the second antenna element, and
wherein the first RF circuit is further configured to receive the second feedback signal provided from the second RF circuit on a reception path of the first RF circuit through the first switch and the second switch.

19. The apparatus of claim 16, wherein the first feedback electrical path comprises a coaxial cable.

20. The apparatus of claim 16, wherein at least one of the first, second, third, or fourth switches comprises a single-pole double-throw (SPDT) switch.

* * * * *